US011195162B2

(12) United States Patent
Dunsmore et al.

(10) Patent No.: US 11,195,162 B2
(45) Date of Patent: Dec. 7, 2021

(54) SYSTEM FOR DEFINING AND TRACKING TRANSACTIONS OF MOBILE DEVICES

(71) Applicant: VMware, Inc., Palo Alto, CA (US)

(72) Inventors: Kevan Dunsmore, Lafayette, CA (US); David Shirley, Oakland, CA (US); Paul Lappas, San Francisco, CA (US); Andrew Levy, San Francisco, CA (US); Robert Kwok, San Francisco, CA (US); Sean Hermany, San Francisco, CA (US); David Albrecht, San Francisco, CA (US)

(73) Assignee: VMWARE, INC., Palo Alto, CA (US)

( * ) Notice: Subject to any disclaimer, the term of this patent is extended or adjusted under 35 U.S.C. 154(b) by 691 days.

(21) Appl. No.: 14/576,190

(22) Filed: Dec. 18, 2014

(65) Prior Publication Data

US 2016/0098697 A1    Apr. 7, 2016

Related U.S. Application Data

(60) Provisional application No. 62/060,548, filed on Oct. 6, 2014.

(51) Int. Cl.
G06Q 20/32    (2012.01)
G06F 11/34    (2006.01)

(52) U.S. Cl.
CPC ......... *G06Q 20/32* (2013.01); *G06F 11/3466* (2013.01); *G06F 11/3495* (2013.01);
(Continued)

(58) Field of Classification Search
CPC . G06Q 20/32; G06F 11/3466; G06F 11/3495; G06F 11/3476; G06F 11/3419;
(Continued)

(56) References Cited

U.S. PATENT DOCUMENTS 8,380,576 B2 *   2/2013   Callahan ................ G06Q 10/10
                                                       455/405
8,713,531 B1 *   4/2014   Pettis ................... G06F 11/3688
                                                       717/124
(Continued)

FOREIGN PATENT DOCUMENTS

EP            2270664 A2 *   1/2011   .......... G06F 11/3433
WO   PCT/US2015/053861       10/2015

OTHER PUBLICATIONS

M. W. Johnson, "Monitoring and diagnosing application response time with ARM," Proceedings of the IEEE Third International Workshop on Systems Management, 1998, pp. 4-13, doi: 10.1109/IWSM.1998.668123 (Year: 1998).*
(Continued)

*Primary Examiner* — Bennett M Sigmond
*Assistant Examiner* — James H Miller
(74) *Attorney, Agent, or Firm* — Thomas Horstemeyer, LLP

(57) ABSTRACT

A system that allows developers to designate transactions for an application to track and monitor the performance of their applications on various mobile devices. In some embodiments, each transaction is composed of multiple interactions across several different screens that interact with different services or functions. The transactions of some embodiments overlap or are nested within each other, so that multiple transactions are monitored simultaneously. In some embodiments, each transaction is assigned a value, allowing a developer to prioritize troubleshooting in an application, as well as quantifying the costs of various issues in the application. In some embodiments, the system includes a transaction agent is installed on various devices that identifies and monitors transactions in the system and a transaction server that receives transaction data from the mobile devices (Continued)

| Name/Type | Volume | Avg Time | Users | Failed | Successful | Slow | Revenue Risk |
|---|---|---|---|---|---|---|---|
| Load | 33,146 | 0:24 | 31,241 | 0 | 33,146 | 347 | $347 |
| Login | 25,931 | 2:11 | 23,144 | 147 | 22,997 | 1,897 | $5.00 |
| Checkout | 19,128 | 1:10 | 12,315 | 8,527 | 10,601 | 175 | $10,656 |
| ... | ... | ... | ... | ... | ... | ... | ... |

1701

1705

1712

| Root Cause Report | Transaction Trace | | |
|---|---|---|---|
| Name | Status | Affected Users | # in Transaction |
| SIGSEGV - [PurchaseHandler checkout:] | Unresolved | 784 | 1,002 |
| NSInvalidArgumentException - An AVPlaye... | Unresolved | 654 | 952 |
| ... | ... | ... | ... |

1702

1710 and processes the data to allow a developer to monitor the performance of the application.

20 Claims, 23 Drawing Sheets

(52) U.S. Cl.
CPC ...... *G06F 11/3409* (2013.01); *G06F 11/3419* (2013.01); *G06F 11/3476* (2013.01); *G06F 2201/86* (2013.01); *G06F 2201/865* (2013.01); *G06F 2201/87* (2013.01)

(58) Field of Classification Search
CPC ........... G06F 2201/865; G06F 2201/86; G06F 2201/87; G06F 11/3409; G06F 11/0742; G06F 11/0757; G06F 11/0748; G06F 11/0778
See application file for complete search history.

(56) References Cited

U.S. PATENT DOCUMENTS

| | | | |
|---|---|---|---|
| 8,861,360 B2 | 10/2014 | Chang et al. | |
| 8,898,637 B2 | 11/2014 | Surazski et al. | |
| 8,978,149 B2 * | 3/2015 | Barraclough | G06F 21/10 705/14.55 |
| 9,438,491 B1 * | 9/2016 | Kwok | G06Q 30/0201 |
| 2002/0184575 A1 * | 12/2002 | Landan | G06F 11/323 714/47.2 |
| 2004/0068560 A1 * | 4/2004 | Oulu | H04L 69/329 709/224 |
| 2006/0218533 A1 | 9/2006 | Koduru et al. | |
| 2009/0241048 A1 * | 9/2009 | Augustine | G06Q 10/10 715/769 |
| 2010/0058345 A1 * | 3/2010 | Seidman | G06F 11/3419 718/101 |
| 2011/0196761 A1 * | 8/2011 | Callahan | G06Q 10/10 705/27.1 |
| 2012/0023475 A1 * | 1/2012 | Surazski | G06Q 30/01 717/100 |
| 2013/0019008 A1 * | 1/2013 | Jorgenson | G06F 11/3495 709/224 |
| 2014/0024348 A1 | 1/2014 | Hurst et al. | |
| 2014/0113588 A1 | 4/2014 | Chekina et al. | |
| 2014/0372285 A1 * | 12/2014 | Bryant | G06Q 40/00 705/39 |

OTHER PUBLICATIONS

International Search Report and Written Opinion for PCT/US2015/053861, dated Jan. 4, 2016, CRITTERCISM, INC.
Author Unknown, "PonyDebugger," month unknown, 2013, 9 pages, available at http://web.archive.org/web/20130901043356/https://github.com/square/PonyDebugger.

* cited by examiner

1301

| ID | Name | Begin Time | End Time | Status | Value | ... |
|----|------|------------|----------|--------|-------|-----|
| 1 | Billing | 7/10/14 12:47:09 | 7/10/14 12:48:09 | Success | $123 | ... |
| 2 | Checkout | 7/10/14 12:48:13 | 7/10/14 12:49:03 | Crashed | $35 | ... |

1305

| ID | Type | Timestamp |
|----|------|-----------|
| 1 | Memory Overflow | 7/10/14 12:49:03 |
| | ... | ... |

1310

| ID | Name | Begin Time | End Time | Status | Value | CrashID | ... |
|----|------|------------|----------|--------|-------|---------|-----|
| 1 | Billing | 7/10/14 12:47:09 | 7/10/14 12:48:09 | Success | $123 | | ... |
| 2 | Checkout | 7/10/14 12:48:13 | 7/10/14 12:49:03 | Crashed | $35 | 1 | ... |

1315

| Type | Breadcrumb | Description | Timestamp |
|------|------------|-------------|-----------|
| Device | 97 | Switching from LTE to EDGE | 7/10/14 12:47:09 |
| User | 98 | Clicked Checkout | 7/10/14 12:52:40 |
| Cloud | 99 | POST - https://connect.myapp.com/checkout | 7/10/14 12:52:58 |
| Crash | 100 | CRASH SIGSEGV - [PurchaseHandler che... | 7/10/14 12:53:15 |

| ID | Name | Begin Time | End Time | Status | Value | CrashID | BCID | ... |
|---|---|---|---|---|---|---|---|---|
| 1 | Billing | 7/10/14 12:47:09 | 7/10/14 12:47:09 | Success | $123 | | 97 | ... |
| 2 | Checkout | 7/10/14 12:48:13 | 7/10/14 12:49:03 | Crashed | $35 | 1 | | ... |

| Name /Type | Timestamp | Status | Value |
|---|---|---|---|
| login | 7/14/2014 08:00:00 | Success | $1 |
| login | 7/14/2014 08:00:05 | Success | $1 |
| checkout | 7/14/2014 08:00:30 | Success | $40 |
| checkout | 7/14/2014 08:01:10 | Success | $30 |
| login | 7/14/2014 08:01:30 | Success | $1 |
| checkout | 7/14/2014 08:00:45 | Success | $50 |
| login | 7/14/2014 08:00:50 | Success | $1 |
| ... | ... | ... | ... |

1401

1405

| Name /Type | Timestamp | Status | Value |
|---|---|---|---|
| login | 7/14/2014 08:00 | Success | $2 |
| checkout | 7/14/2014 08:00 | Success | $40 |
| checkout | 7/14/2014 08:01 | Success | $80 |
| login | 7/14/2014 08:01 | Success | $2 |
| ... | ... | ... | ... |

SYSTEM FOR DEFINING AND TRACKING TRANSACTIONS OF MOBILE DEVICES

BACKGROUND

The mobile device industry has been growing for a number of years. The growth in the industry has led to a proliferation of many different types of mobile devices from various different vendors. With the growth, there is an increasing demand for quality applications. Many application developers rely on user feedback to determine if there are any issues (e.g., crash issues, slow response times, etc.) with their applications. Such user feedback may be valuable, but it may not provide the developers with real-time data relating to a user's interaction with an application. The user feedback may also not provide (e.g., at least in real-time and with minimum effort) if a particular issue is an isolated case or is occurring across a number of mobile devices. In addition, it is difficult to determine the business effects of issues with the applications.

BRIEF SUMMARY

Some embodiments provide a transaction system that allows developers of an application to designate transactions that allow a transaction agent to track and monitor the performance of different portions of the application on various mobile devices. Transactions are arbitrary units of business value or user interactions in an application. In some embodiments, custom transactions are defined by an application developer using software development kit (SDK) calls that indicate the beginning and end of a transaction. Alternatively or conjunctively, some transactions to be monitored are automatically identified through analysis of transaction data by the transaction system.

For purposes of clarity, the term "user" will be used to refer to end users of the developed application, while the term "developer" will be used to refer to any entity (e.g., developers, business managers, etc.) related to the development of the application. The developers use the transaction system to monitor transactions of the developed application on mobile devices.

There are a variety of transactions that occur on mobile devices (e.g., checkout transactions in an ecommerce app, buying/selling stock in a financial services app, order entry in an enterprise field force app, etc.). In some embodiments, each transaction is composed of multiple interactions across several different views, or screens, that interact with different services or functions, internal or external to the application itself. For example, a single transaction may include calls to Internet services, application servers, and local databases. Alternatively or conjunctively, transactions may be very simple, composed of only one or a few interactions or functions. The transactions of some embodiments overlap or are nested within each other, so that multiple transactions are monitored simultaneously.

In some embodiments, each transaction is assigned a value, allowing a developer to prioritize troubleshooting different portions of an application, as well as quantifying the costs of various issues in the application. The value of a transaction may be based on user input (e.g., the value of items in a shopping cart) or may be based on a business valuation of a particular transaction (e.g., each successful login to an application may be assigned a particular value by the developer). In some embodiments, the value of each transaction can be updated for future transactions while maintaining the previous value of previously completed transactions. The transactions of some embodiments contain multiple different values. For example, in some embodiments, the developer sets a monetary business value, as well as a customer experience value to rate the experience of a user.

In some embodiments, a transaction agent that identifies and monitors transactions in the system is installed on various devices. The transaction agent of some embodiments receives configuration settings (e.g., transaction values, timeout settings, etc.) for the transactions when the transaction agent is initialized on a device. The transaction agent also stores data for each transaction to track various information for each transaction (e.g., start time, end time, status, etc.).

In some embodiments, the transaction agent tracks various secondary information for each transaction. The secondary information of some embodiments includes system state information, such as operating system version, app version, wireless carrier, etc. In some embodiments, the secondary information includes application and/or system events, or breadcrumbs, during the execution of the transaction. Breadcrumbs, or traces, are events that may be defined by the system or by a developer that indicate the occurrence of different events during a transaction. The breadcrumbs may include events that are triggered by the application itself (e.g., a new screen is loaded, a specific item is selected, etc.) or by the mobile device (e.g., an application is sent to the background, network connectivity is lost, etc.). In some embodiments, the secondary information also includes crash data for a transaction that is recorded when the device or the application crashes during a transaction.

In some embodiments, the system includes a transaction server that receives transaction data (including the secondary data) from the transaction agents on the mobile devices and processes the transaction data to allow a developer to monitor the performance of transactions in the application. In some embodiments, the transaction server receives the transaction data using different processing pipelines for successful and failed transactions. A successful transaction includes any transaction that eventually reaches the end of the transaction, even if the transaction is "slow" or takes longer than a threshold length of time. A failed transaction includes transactions that fail for various reasons (e.g., when the application or device crashes, when the user aborts the transaction, the transaction times out, handled/unhandled errors, etc.).

The transaction server of some embodiments processes the received transaction data to associate the secondary data with the transactions. The transaction server of some embodiments also aggregates the received transaction data into larger time increments, such as in minute, hourly, or daily intervals to provide high-level views of the transaction data, allowing for faster access and analysis. In some embodiments, the aggregated transaction data for the different time intervals is stored in separate tables or sub-tables to decrease access times when retrieving the transaction data.

The transaction server of some embodiments performs additional analysis to provide troubleshooting information (e.g., trend analysis, root cause analysis, etc.) regarding the transactions. The transaction server of some embodiments provides the aggregated and analyzed transaction data to the developer to provide insights into the performance of transactions in the application on various devices.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

FIGS. 13A-B illustrate an example of mapping collected data to transactions.

FIG. 14 illustrates an example of aggregating transaction data.

DETAILED DESCRIPTION

Figure 1:
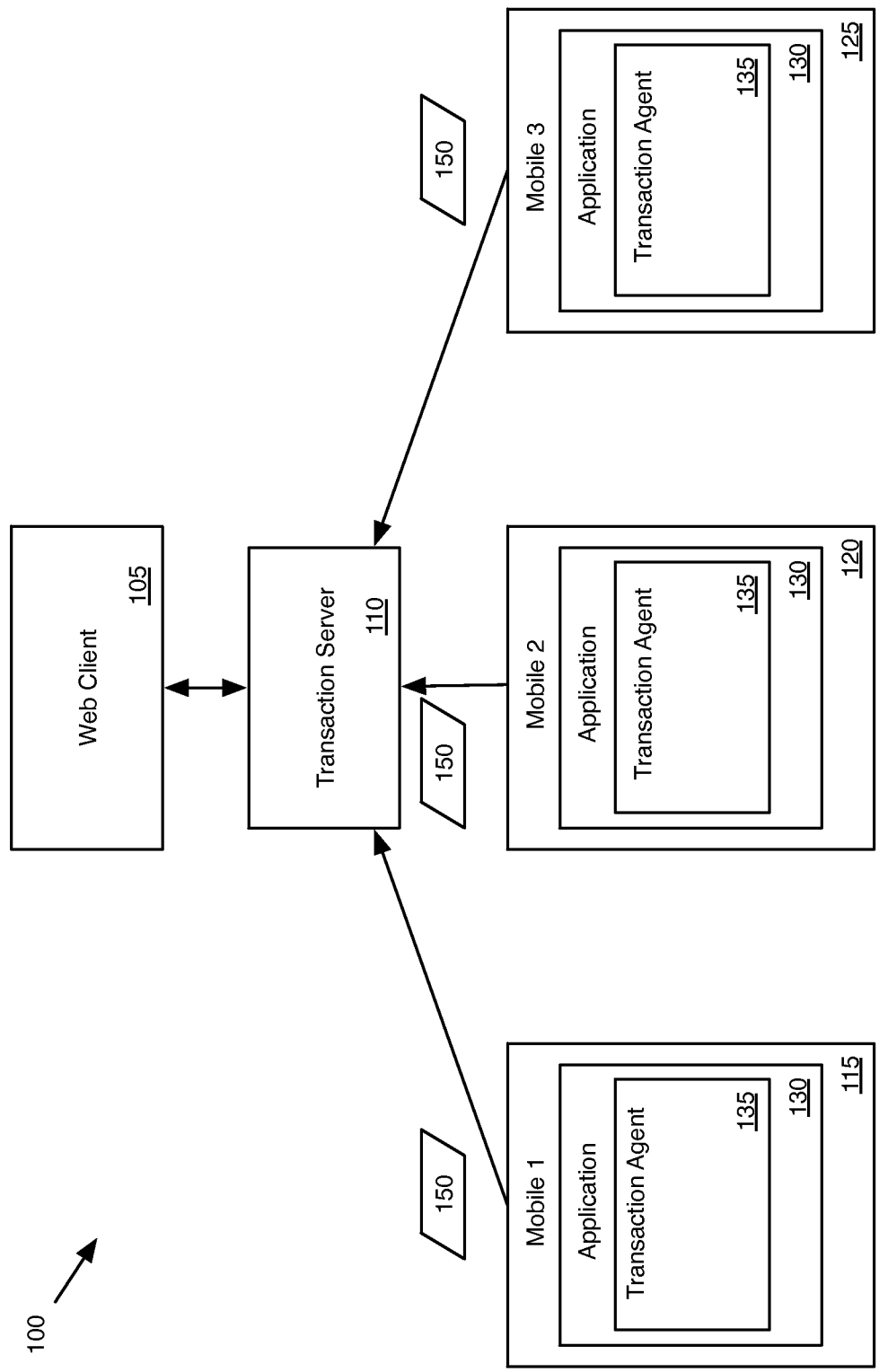
FIG. 1 conceptually illustrates a transaction system of some embodiments for tracking and monitoring the performance of transactions on mobile devices.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a transaction system that allows developers of an application to designate transactions that allow a transaction agent to track and monitor the performance of different portions of the application on various mobile devices. Transactions are arbitrary units of business value or user interactions in an application. In some embodiments, custom transactions are defined by an application developer using software development kit (SDK) calls that indicate the beginning and end of a transaction. Alternatively or conjunctively, some transactions to be monitored are automatically identified through analysis of transaction data by the transaction system.

For purposes of clarity, the term "user" will be used to refer to end users of the developed application, while the term "developer" will be used to refer to any entity (e.g., developers, business managers, etc.) related to the development of the application. The developers use the transaction system to monitor transactions of the developed application on mobile devices.

There are a variety of transactions that occur on mobile devices (e.g., checkout transactions in an ecommerce app, buying/selling stock in a financial services app, order entry in an enterprise field force app, etc.). In some embodiments, each transaction is composed of multiple interactions across several different views, or screens, that interact with different services or functions, internal or external to the application itself. For example, a single transaction may include calls to Internet services, application servers, and local databases. Alternatively or conjunctively, transactions may be very simple, composed of only one or a few interactions or functions. The transactions of some embodiments overlap or are nested within each other, so that multiple transactions are monitored simultaneously.

In some embodiments, each transaction is assigned a value, allowing a developer to prioritize troubleshooting different portions of an application, as well as quantifying the costs of various issues in the application. The value of a transaction may be based on user input (e.g., the value of items in a shopping cart) or may be based on a business valuation of a particular transaction (e.g., each successful login to an application may be assigned a particular value by the developer). In some embodiments, the value of each transaction can be updated for future transactions while maintaining the previous value of previously completed transactions. The transactions of some embodiments contain multiple different values. For example, in some embodiments, the developer sets a monetary business value, as well as a customer experience value to rate the experience of a user.

In some embodiments, a transaction agent that identifies and monitors transactions in the system is installed on various devices. The transaction agent of some embodiments receives configuration settings (e.g., transaction values, timeout settings, etc.) for the transactions when the transaction agent is initialized on a device. The transaction agent also stores data for each transaction to track various information for each transaction (e.g., start time, end time, status, etc.).

In some embodiments, the transaction agent tracks various secondary information for each transaction. The secondary information of some embodiments includes system state information, such as operating system version, app version, wireless carrier, etc. In some embodiments, the secondary information includes application and/or system events, or breadcrumbs, during the execution of the transaction. Breadcrumbs, or traces, are events that may be defined by the system or by a developer that indicate the occurrence of different events during a transaction. The breadcrumbs may include events that are triggered by the application itself (e.g., a new screen is loaded, a specific item is selected, etc.) or by the mobile device (e.g., an application is sent to the background, network connectivity is lost, etc.). In some embodiments, the secondary information also includes crash data for a transaction that is recorded when the device or the application crashes during a transaction.

In some embodiments, the system includes a transaction server that receives transaction data (including the secondary data) from the transaction agents on the mobile devices and processes the transaction data to allow a developer to monitor the performance of transactions in the application. In some embodiments, the transaction server receives the transaction data using different processing pipelines for successful and failed transactions. A successful transaction includes any transaction that eventually reaches the end of the transaction, even if the transaction is "slow" or takes longer than a threshold length of time. A failed transaction includes transactions that fail for various reasons (e.g., when the application or device crashes, when the user aborts the transaction, the transaction times out, handled/unhandled errors, etc.).

The transaction server of some embodiments processes the received transaction data to associate the secondary data with the transactions. The transaction server of some embodiments also aggregates the received transaction data into larger time increments, such as in minute, hourly, or daily intervals to provide high-level views of the transaction data, allowing for faster access and analysis. In some embodiments, the aggregated transaction data for the different time intervals is stored in separate tables or sub-tables to decrease access times when retrieving the transaction data.

The transaction server of some embodiments performs additional analysis to provide troubleshooting information (e.g., trend analysis, root cause analysis, etc.) regarding the transactions. The transaction server of some embodiments provides the aggregated and analyzed transaction data to the developer to provide insights into the performance of transactions in the application on various devices.

FIG. 1 conceptually illustrates a transaction system 100 of some embodiments for tracking and monitoring the performance of transactions on mobile devices. Specifically, this figure shows the system 100, which includes a web client 105, transaction server 110, and mobile devices 115, 120, and 125.

In the example of FIG. 1, the mobile devices 115, 120, and 125 can be any mobile device that runs a mobile operating system (OS). Examples of different types of mobile devices include a smart phone, a tablet, a smart watch, a phablet, etc. In some embodiments, the system 100 monitors transactions that occur on other types of electronic devices, such as a digital media player appliance, a game system, a smart television (TV), a smart appliance, desktop computer, laptop, etc. Examples of different types of mobile OSs include iOS® by Apple Inc., Android™ OS by Google Inc., Windows Phone®, etc.

The different mobile devices or mobile OSs (or different versions of the same OS) may raise different issues for a developer's application. In some embodiments, the system 100 tracks information about the different mobile devices and mobile OSs to allow a developer to quickly pinpoint issues that occur during transactions that may be specific to particular devices or mobile OSs.

Each of the mobile devices 115, 120, and 125 includes an application 130 and a transaction agent 135 for tracking transactions of the application 130. Although illustrated as a part of the application 130, in some embodiments the transaction agent 135 is a separate, stand-alone application for tracking transactions of one or more applications on the mobile devices 115, 120, and 125.

In some embodiments, the application 130 can be a native application, a carrier-based application, or a third-party application. The application 130 is developed by a developer and monitored using the transaction system 100. In some embodiments, multiple different versions of the application may be installed on various mobile devices 115, 120, and 125. The versions may differ for different types of devices and different mobile OSs, but even for the same device and mobile OS, multiple versions may be installed (e.g., when users have not yet upgraded the application to the most recent version).

Each application 130 running on the mobile devices 115, 120, and 125 may each execute several different transactions for a user in a particular session. Transactions of some embodiments can overlap or become nested within each other when a new transaction begins before another transaction ends. Transactions that overlap or are nested allow a developer to monitor various, arbitrary portions of an application. The different transactions may provide value for different groups.

For instance, a checkout transaction may be defined around a checkout process for a web storefront. The checkout process may include adding items to a shopping cart, gathering payment and shipping information, and confirming the order. Another transaction, such as a billing transaction, may be nested within the checkout process. The nested billing transaction of some embodiments includes only the processes of the checkout process that are related to receiving and confirming billing information, such as processes for performing billing information verification and storing customer billing information. Nesting the billing transaction within the larger checkout transaction allows a developer to troubleshoot and improve the overall checkout process, while another developer may focus on problems more specific to the billing process (e.g., issues with connections to a certain payment services provider, etc.).

The transaction agent 135 of some embodiments runs on the mobile devices 115, 120, and 125 to detect and monitor the transactions as they are executed on the mobile devices. The transaction agent 135 maintains various information regarding each transaction (e.g., time spent in the foreground, total time of the transaction, etc.). In some embodiments, the transaction agent 135 also monitors the device and the application for various secondary information. The secondary information of some embodiments include breadcrumbs, or events, that occur during a transaction (e.g., changes in network state, system events, etc.), as well as crash data for crashes in the application 130 or in the devices themselves.

When the application or the device crashes, the transaction agent 135 of some embodiments gathers any available information about the transactions and the crash, and marks all of the unfinished transactions as failed. In some embodiments, when a crash occurs, the transaction agent 135 detects that the crash has occurred and saves data relating to the crash.

When transaction and secondary data have been collected, the transaction agent 135 of some embodiments sends the transaction data 150 along with the secondary data to the server for storage and processing. The transaction data 150 may be sent at specified intervals, or when a threshold number of transactions are ready to be sent to the transaction server 110.

The transaction server 110 of some embodiments receives and processes the transaction data from the various mobile devices 115, 120, and 125. The transaction server 110 of some embodiments processes the data to provide efficient and useful views of the transaction data to developers of the application. In some embodiments, processing the data includes mapping the collected secondary data to the transactions and aggregating the transaction data to provide meaningful summarized data to developers of the application. In some embodiments, the transaction server 110 also performs additional analysis on the received data to identify root causes, potential transactions, and other useful information.

The web client 105 provides one or more different views of the transaction data, which is received and processed by the transaction server 110, to a developer of the application. In the example of FIG. 1, the web client 105 is a standard web browser that accesses the transaction server 110. The web client 105 presents an interface to the transaction data on the transaction server to the developer. In some embodiments, the processed transaction data on the transaction server 110 can be accessed via a stand-alone application, or any other distributed software application or service. For instance, instead of a thin client, the system 100 may provide a thick client application to access the transaction data on the transaction server 110.

Based on the transaction data, the web client 105 of some embodiments generates a real-time global view of transactions and related data across different mobile device platforms (e.g., iOS, Android, Windows Phone®, etc.). For example, the captured data may be presented in statistical and/or in graphical format. Such a format allows developers to easily track (e.g., in real-time) the performance of transactions as they are performed on one or more of their applications across different types of mobile devices, mobile OSs, application versions, carriers, etc.

In some embodiments, the web client 130 generates different views, or reports, with trends associated with the monitored applications. Trending represents tracking captured data over some period of time to detect and diagnose changes in the application's performance. The trends can be over different types of data. For instance, the transaction server of some embodiments allows developers to track real-time and historical performance across device, OS, versions, etc. The transaction server may allow developers to view trends by device, OS, and carrier.

For developers, such trends can be important from a business perspective as well as a technical perspective. The developers of the application may include many different roles that are related to the development of the application (e.g., developers of the source code, information technology (IT) personnel, business managers, executives, etc.). From a business perspective, the trends allow the developers to know which device (e.g., make and/or model), OS (e.g., version), and/or carrier is the most popular. From a technical perspective, the trends allow the developers to know which device, OS, and/or carrier is the most problematic across the developer's user base. Developers are able to access and analyze the transaction data to prioritize their work in order to improve the performance of specific transactions within the application.

While many of the features of the system 100 have been described as being performed by one component (e.g., the transaction server 110, the transaction agent 135, etc.), one of ordinary skill in the art will recognize that the functions of such components and other components described herein might be split up into multiple sub-components. Similarly, functions described as being performed by multiple different components might be performed by a single component, in some embodiments.

Many examples of operations of the transaction monitoring system are described below. Specifically, Section I describes an example of a transaction agent for monitoring transactions. This is followed by Section II, which describes an example of a transaction server for processing the transaction data. Section III then describes example transaction reports. Finally, Section IV describes electronic systems for implementing some embodiments of the invention.

I. Transaction Agent

In some embodiments, transactions that are defined by a developer are monitored by a transaction agent that is installed at each instance of the application on several different mobile devices. The transaction agent of some embodiments monitors transactions that occur in the application and reports data regarding the transactions to a transaction server. Transactions can be defined by the developer, either in the source code for the application or through run-time configuration, to monitor arbitrary units of business value across multiple instances and multiple versions of an application across several different devices. In some embodiments, a transaction spans multiple user interactions, application screens, and system events.

The transaction agent of some embodiments is initialized when the application to be monitored is launched (e.g., upon startup of the device, when an icon for the application is selected, etc.) on the device. In other embodiments, the transaction agent is a standalone application that is launched separately from the application(s) to be monitored. Transactions may be monitored at various stages of the application. In some embodiments, the transaction agent automatically monitors the loading of an application. In some of these embodiments, the transaction agent records separate transactions for cold app loads (i.e., for a first-time load) and warm app loads (i.e., loading from the background).

Figure 2:
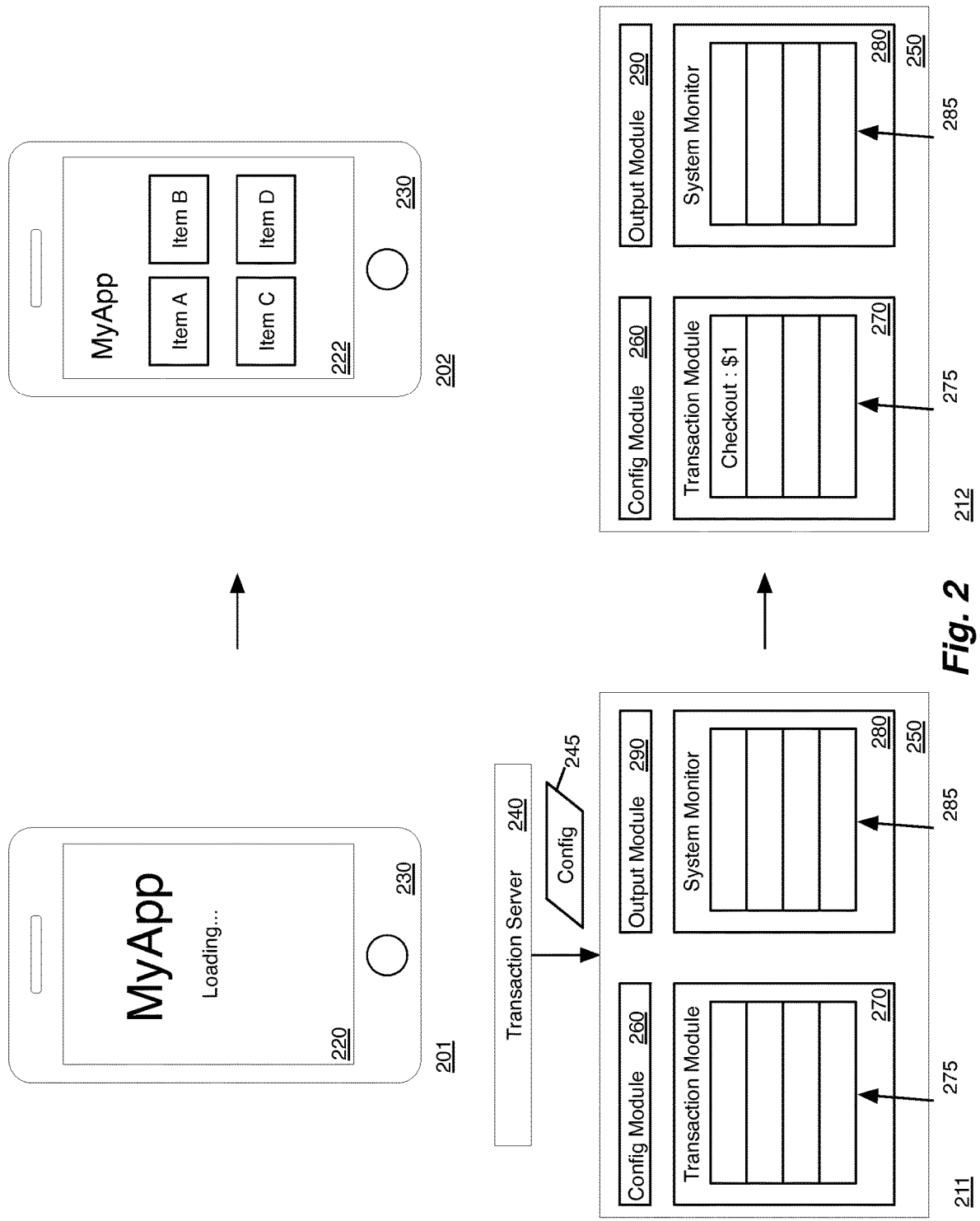
FIG. 2 illustrates an example of initiating monitoring for a transaction on a mobile device.

In some embodiments, when the transaction agent is initialized on the mobile device, the transaction agent receives configuration information from the transaction server to configure the transaction agent before the transaction agent begins monitoring an application for transactions. FIG. 2 illustrates an example of initiating monitoring for a transaction on a mobile device in two user interface (UI) stages 201-202 and two system stages 211-212. The two UI stages 201-202 illustrate the UI of an application executing on a mobile device 230, while the two corresponding system stages 211-212 conceptually illustrate an example software architecture of a transaction agent 250 that monitors the application.

In this example, as well as many other examples below, the mobile device 230 is a smart phone. However, one of ordinary skill in the art will understand that the discussion in this example as well as other examples discussed hereinafter is equally applicable to other kinds of mobile devices (e.g., a tablet, a smart watch, etc.) or any other electronic device (e.g., a digital media player appliance, a game system, etc.).

The first UI stage 201 shows a loading screen 220 on a touch-screen display of the mobile device 230 to indicate that an application, MyApp, is being loaded on the device. As described above, in some embodiments, loading the application causes the transaction agent to also be initiated on the mobile device. The corresponding first system stage 211 shows a transaction agent 250 that receives configuration data 245 from the transaction server 240. In some embodiments, the configuration module 260 of the transaction agent 250 uses the configuration data 245 to configure the transaction agent 250 for monitoring transactions of the application executing on the mobile device 230.

In some embodiments, the configuration data 245 includes various types of data that can be used to configure the monitoring of transactions. The configuration data 245 of some embodiments includes timeout values, slow threshold values, transaction definitions, transaction values, etc. Timeout values of some embodiments define when a transaction has timed out, forcing a transaction to end. Slow threshold values, on the other hand, do not force a transaction to end, but define a threshold period of time for defining slow transactions that complete successfully, but take longer than expected. In some embodiments, the slow threshold value for a particular transaction is based on a number (e.g., 2) of standard deviations from an average or median time to completion for the particular transaction. Transaction definitions of some embodiments define the bounds (i.e., the beginning and end) of a particular transaction. Transaction values are quantitative values specified for a particular transaction by a developer of the application to estimate the risk associated with the failure of the particular transaction. The configuration data 245 may include more information or less information in different embodiments.

Figure 3:
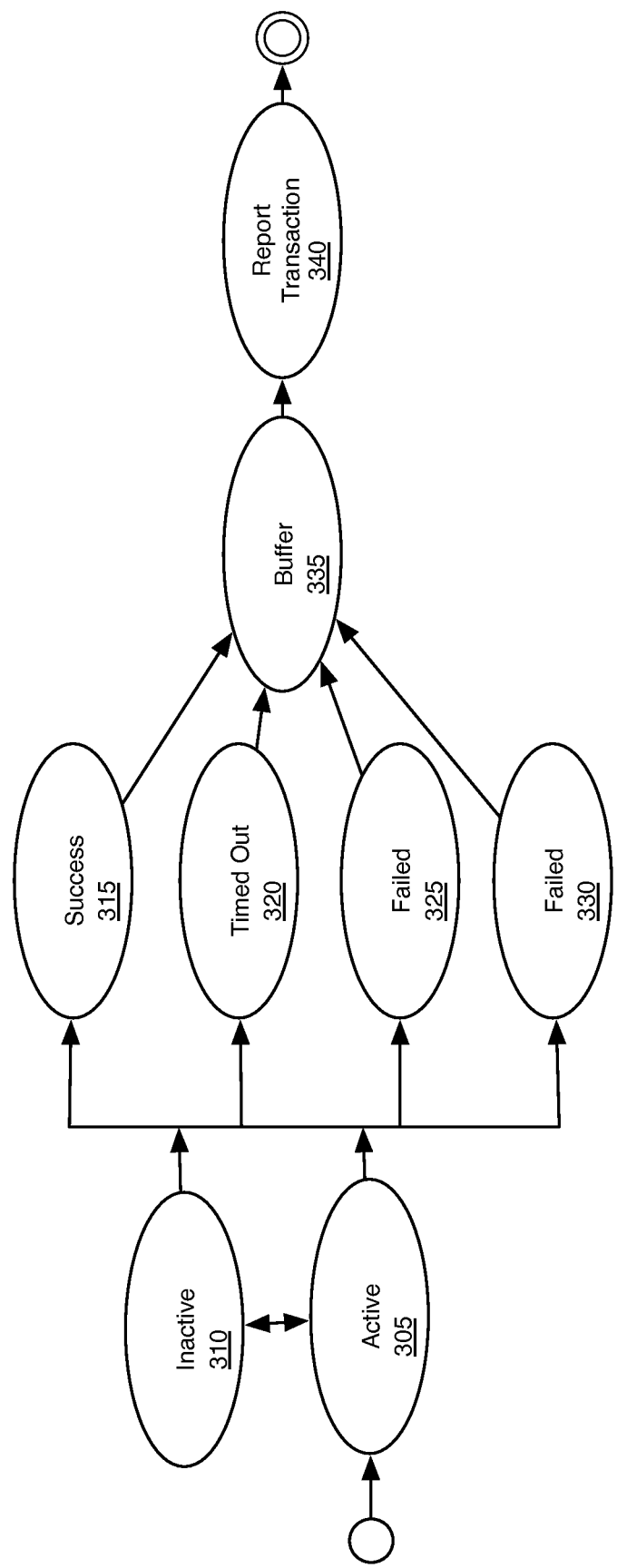
FIG. 3 conceptually illustrates states of a transaction agent for monitoring transactions and reporting transaction data to a transaction server.

Once the transaction agent is loaded and configured, the transaction agent begins monitoring the application for the beginning of a transaction. FIG. 3 shows eight states 305-340 of a transaction that is monitored by the transaction agent. The state diagram 300 illustrates different states of an individual transaction. The eight states 305-340 include an active state 305, an inactive state 310, a success state 315, a timeout state 320, a failed state 325, a crash state 330, a buffer state 335, and a reporting state 340.

When the transaction agent detects the beginning of a transaction, the transaction agent enters an active state 305. The active state 305 is where most of the operations of the application and the transaction are performed. The bounds (i.e., the beginning and the end) of a transaction in some embodiments are based on the occurrence of a set of beginning and ending events that are specified by the developer. In some embodiments, the developer may define a transaction using software development kit (SDK) calls in the source code (e.g., a function call to begin_transaction ("checkout")) to define a transaction around particular portions of the source code.

In the example of FIG. 2, the second UI stage 202 shows that the application has loaded and is displaying a browse screen 222 on device 230. The browse screen 222 displays various items A-D that the user may purchase. In this example, a "checkout" transaction is initiated when the browse screen 222 is loaded on the device and does not end until items are selected and the order is completed and confirmed. The transaction agent monitors the various steps of the checkout transaction, including building the shopping cart, and receiving and confirming shipping and billing information.

The second system stage 212 shows that the transaction agent 250 has detected the beginning of a checkout transaction and that the transaction module 270 of the transaction agent 250 has detected the beginning of the checkout transaction and added a corresponding entry in the transaction table 275. The entry in the transaction table 275 shows a name and a value for the checkout transaction. The value for the checkout transaction is $1. The initial value for the checkout transaction may be a default value assigned by the developer (e.g., through the configuration data 245) for each type of transaction. Although shown with only two fields, one skilled in the art will recognize that many different fields may be maintained for the different transactions (e.g., transaction duration, status, etc.).

The transaction agent of some embodiments performs various functions to update transaction information (e.g., value, duration, etc.), as well as to update secondary information (e.g., system events, network calls, etc.) related to the transaction. In some embodiments, the transaction agent monitors and updates the transaction and secondary information for several transactions at any given time.

In some embodiments, the secondary information includes mobile state data, breadcrumb data, and crash data. Mobile state data is data related to the state of the mobile device that executes the application, and can include any one or more of the following: carrier information (e.g., the name or identity of the wireless carrier that is servicing the mobile device), geo location information (e.g., latitude, longitude), network connectivity information (e.g., whether the device was on Wi-Fi, cellular, or not connected), mobile network code (MNC), mobile country code (MCC), roaming, time, battery level, memory usage, up time, whether the device is compromised (e.g., jailbroken or rooted), etc.

In some embodiments, the secondary information includes breadcrumb data. Breadcrumb data may include both system breadcrumbs and developer-defined breadcrumbs. System breadcrumbs are breadcrumbs, or events, that are triggered by the device or by another application (other than the monitored application). For example, system breadcrumbs of some embodiments include information about interactions of the application with other applications or services (e.g., cloud services, system services, etc.). System breadcrumbs in some embodiments indicate calls to a network, sending an application to the background, instantiation of other applications, high memory usage warnings, etc.

Developer-defined breadcrumbs are a special feature a company or app developer can implement which specify a series of events that occur during a transaction. The breadcrumbs are customizable by the developer. For instance, the developer might want to know what chain of events (e.g., "Pressed Login", "View Account", "Variable=0") occurred during different transactions in the application. In some embodiments, developers can specify what breadcrumbs they would like to track through a performance monitor tool or the software development kit (SDK). For instance, the developers can leave breadcrumbs through a SDK call: [TransactionMonitor leaveBreadcrumb: @ "hello world"].

In some embodiments, the transaction agent updates crash data, such as a crash log, related to crashes that occur within the application or within the device. The crash log may include a stack trace of code that shows a sequence of method calls that were made by an application leading up to the crash. The crash log may also include other data, such as information regarding a thread that crashed, a type of exception, a reason for the crash, etc.

Figure 4A:
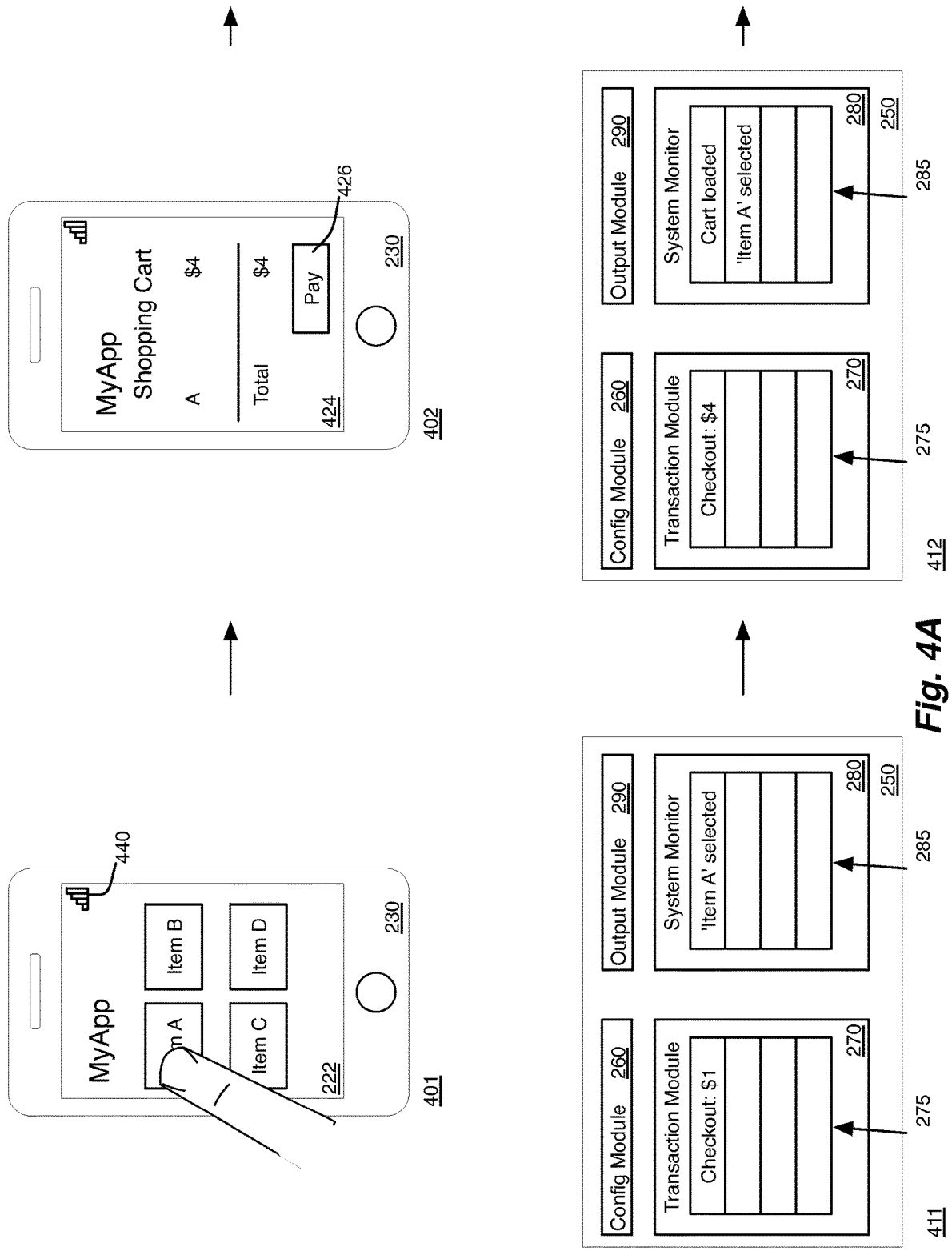
FIGS. 4A-B illustrate an example of monitoring different types of primary and secondary information regarding a transaction on a mobile device.
Figure 4B:
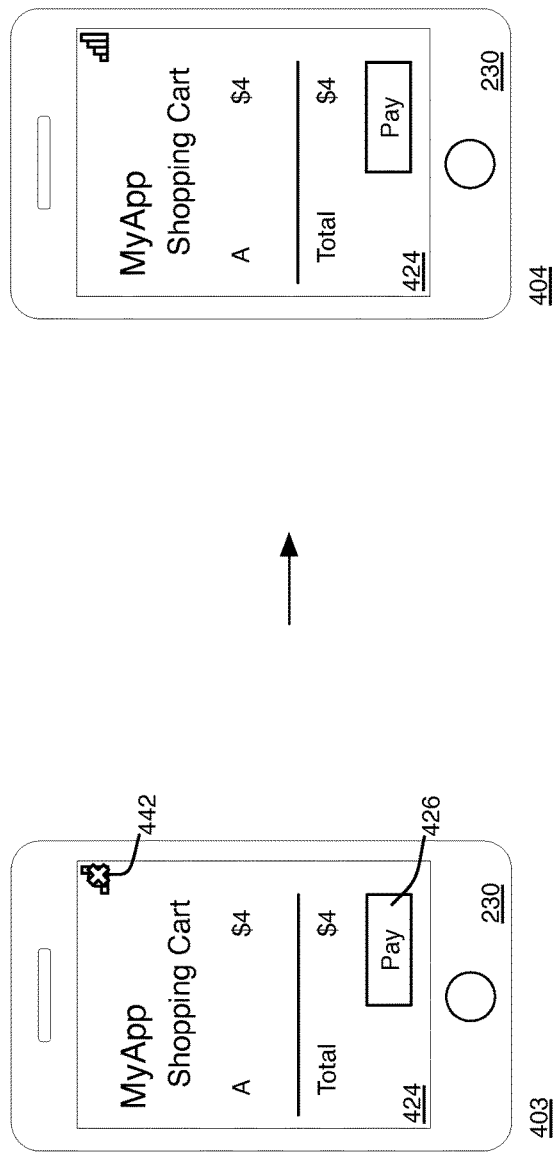

FIGS. 4A-B illustrate an example of monitoring different types of transaction data and secondary data for a transaction on a mobile device. The secondary data of some embodiments includes information about user interactions with the application, specified events within the application, the state of the mobile device, and/or interactions of the application with other applications or services.

The first UI stage 401 and the first system stage 411 are similar to the second UI stage 202 and the second system stage 212 of FIG. 2. The first UI stage 401 shows a user interacting with the application by selecting Item A from the browse screen 222.

One type of secondary data that the transaction agent of some embodiments records is data related to a user's interaction with an application. Different user interactions may include changing settings, selecting or interacting with UI items, etc. In the first system stage 411, the system monitor 280 of the transaction agent 250 has added an entry, 'Item A' selected, to the monitor table 285 to reflect the user's interaction with the application.

The second UI stage 402 shows that after selecting Item A in the first UI stage 401, the device 230 shows a shopping cart screen 424. The shopping cart screen 424 of the second UI stage 402 also shows that Item A has been added to the cart to bring the total for the cart to $4.

In the second system stage 412, the transaction module 270 has updated the transaction information for the checkout transaction. The transaction module 270 maintains and updates transaction information (e.g., when the transaction begins and ends, changes to the value of the transaction, etc.) stored in the transaction table 275. In the second system stage 412, the transaction module 270 has updated the value of the checkout transaction in the transaction table 275 to match the value of the items in the customer's shopping cart (i.e., $4).

Another type of secondary data that the transaction agent of some embodiments records is data related to specified events within the application that may not be related to user interaction with the application. Such application events may be particular function calls, screen changes, debug statements, warnings, etc. In this example, the second system stage 412 shows that the system monitor 280 has added a corresponding entry, 'Cart loaded,' to the monitor table 285, indicating that the shopping cart screen 424 was loaded by the application.

In some embodiments, the transaction module 270 monitors the transactions by monitoring the system monitor table 285 for breadcrumbs, system events, or other event markers. The transaction module 270 of some embodiments monitors, or receives notifications, directly from the application or from other modules in the transaction agent.

Another type of secondary data that the transaction agent of some embodiments records is data related to the state of a mobile device. The mobile state data provides context information for a transaction. In some embodiments, the system monitor 280 updates the mobile state data each time there is a change in the state of the mobile device. Examples of different mobile state data include carrier info (e.g., the name or identity of the wireless carrier that is servicing the mobile device), geo location information (e.g., latitude, longitude), network connectivity information (e.g., whether the device was on Wi-Fi, cellular, or not connected), etc.

The third UI stage 403 is similar to the second UI stage 402, except that the mobile device 230 has lost connection to the network, as indicated by the disconnect icon 442. The third system stage 413 shows that the system monitor 280 has recorded an entry, Net disconnected, to show that the device has lost network connectivity.

The fourth UI stage 404 shows that network connectivity has been restored. The fourth system stage 414 shows that the system monitor 280 has recorded an entry, Net connected, to show that the device has regained network connectivity.

Referring back to FIG. 3, a transaction moves from an active state 305 to an inactive state 310 when the transaction is paused or otherwise made inactive such as when the application is sent to the background of the device (e.g., when the user switches to another application) or when focus is otherwise moved to a different application. The transaction returns to the active state 305 when the application resumes the transaction and the user is again able to interact with the application. In some embodiments, a transaction agent continues to monitor the device for secondary information while the transaction is in the inactive state 310, providing information on events that occur while the transaction is inactive to provide visibility to events that may affect the performance of the transaction.

Figure 4B:
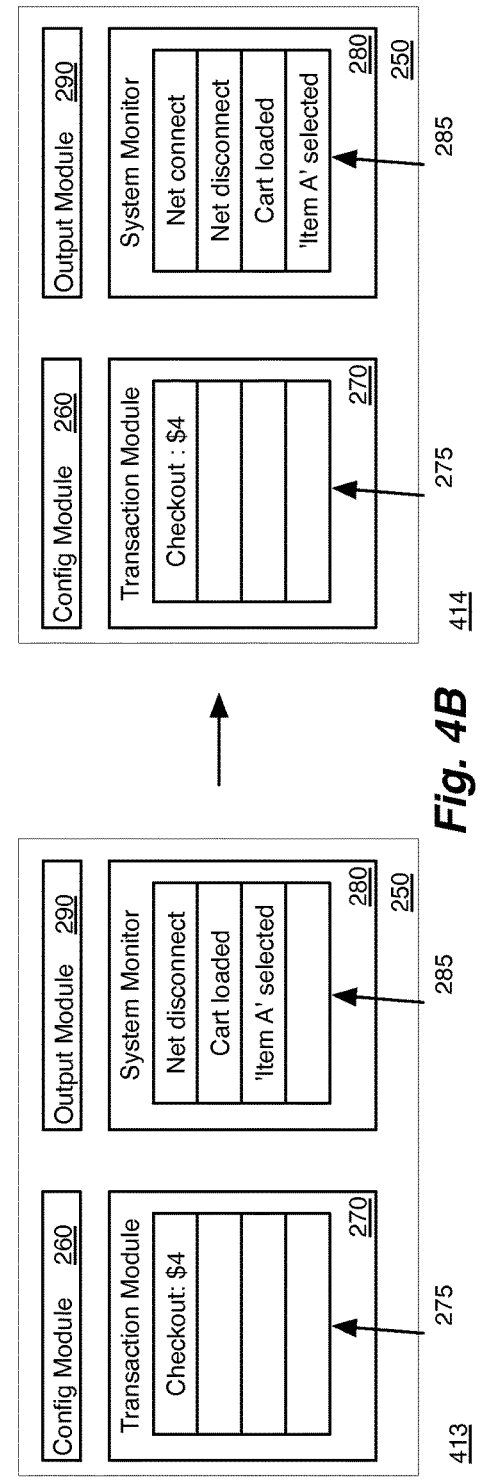
Figure 5A:
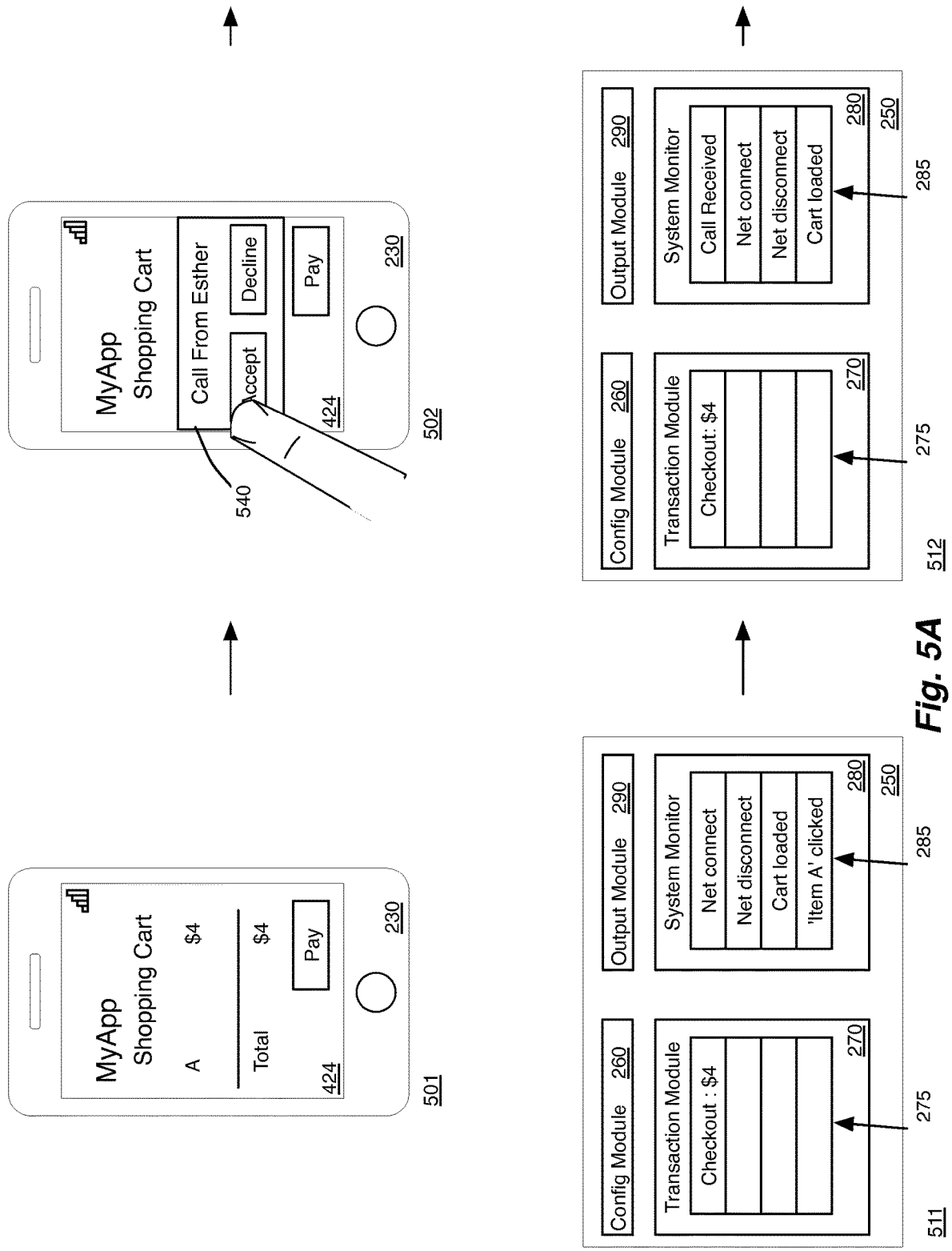
FIGS. 5A-B illustrate an example of an inactive state for a transaction agent on a mobile device.
Figure 5B:
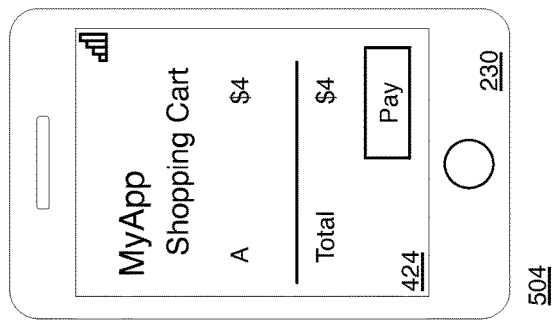
Figure 5B:
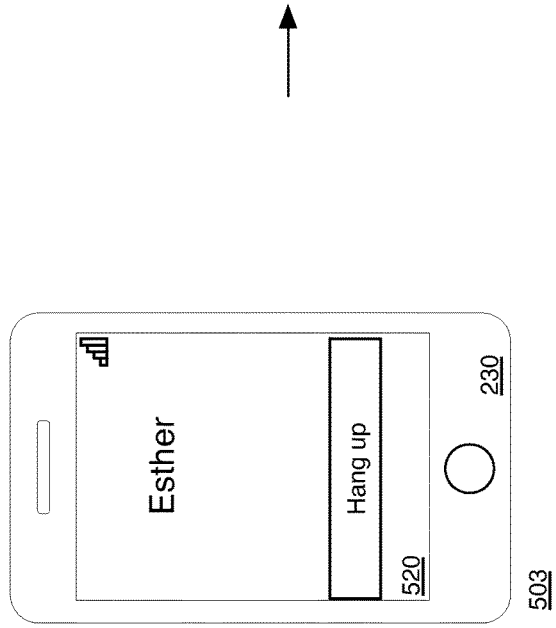
Figure 5B:
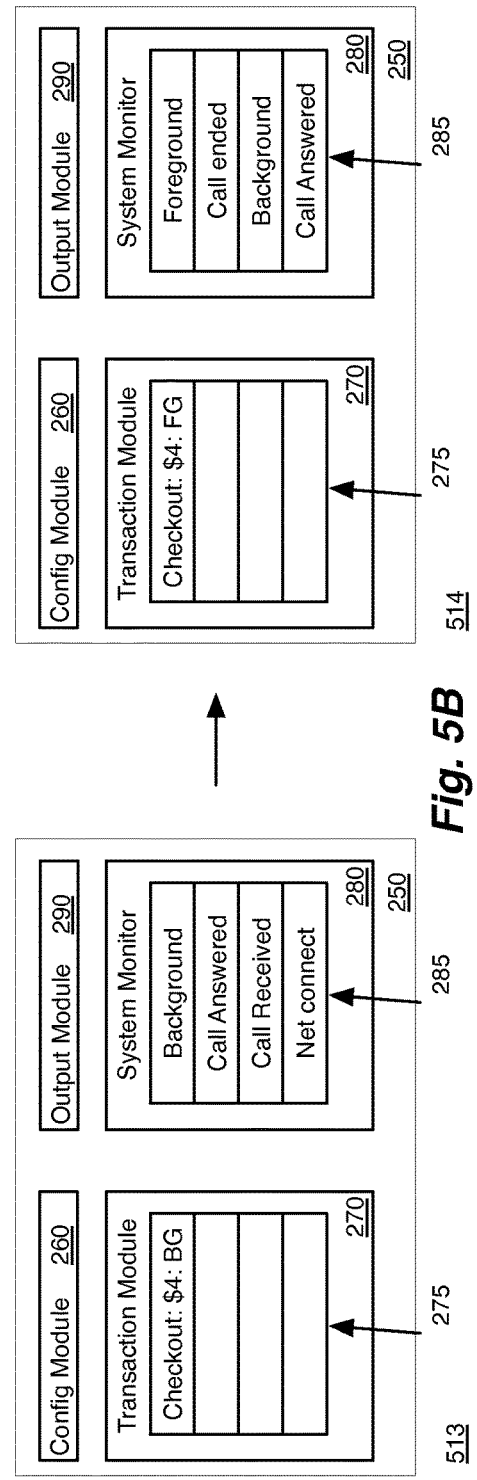

FIGS. 5A-B illustrate an example of an inactive state for a transaction agent on a mobile device. The first UI stage 501 and the first system stage 511 are similar to the fourth UI and system stages 404 and 414 of FIG. 4. The first UI and system stages 501 and 511 show the application in an active state.

The second UI stage 502 shows that the customer has received a phone call while viewing the shopping cart screen 424 of the application. The second system stage 512 shows that the system monitor 280 has recorded a new record in the monitor table 280 indicating that a call was received.

In the third UI stage 503, the user has accepted the phone call, opening a call screen 520 on the mobile device 230 and sending the application to the background. The third system stage 513 shows that the transaction module 270 has updated the entry for the checkout transaction in the transaction table 275. More specifically, the entry for the checkout transaction indicates, with a "BG", that the application was sent to the background, putting the transaction into an inactive state 310. In some embodiments, rather than indicating that the application was sent to the background during the transaction, the transaction is updated to record the amount of time that the application spends in the background, separate from the time spent in the foreground. Although in this example, the transaction enters the inactive state 310 when the application is sent to the background, the transaction of some embodiments enters the inactive state whenever focus is taken away from the application (e.g., when the screen dims, when the user enters inputs into another application, etc.).

The time spent in the background or the foreground can be used for timeout values and slow threshold values. For example, a transaction may have a slow threshold value of 20 seconds and a timeout value of one minute. If the transaction takes two minutes to complete, but spends 90 seconds in the background, then the transaction, which spent only 30 seconds in the foreground, does not time out, but rather is marked as slow to complete.

The third system stage 513 also shows that the first breadcrumb, 'Item A' selected, is no longer shown in the monitor table 285. In some embodiments, the service monitor 280 is used to track only a set number of different breadcrumbs for various types of breadcrumbs. For instance, the service monitor 280 may only log the last several (e.g., ten) network connections, discarding old connection logs as new connections are made. In some embodiments, the number of network breadcrumbs the service monitor logs can be customized based on user input. That is, performance monitor tools of some embodiments may allow a developer to specify (e.g., through the performance monitor tool or kit)

the maximum number of network breadcrumbs to track. In some embodiments, the breadcrumb data collector only retains the last several number of network breadcrumbs in a (e.g., circular) buffer or queue.

The fourth UI stage 504 shows that the user has completed their call with Esther and returned to the shopping cart screen 424 on the device. The fourth system stage 514 shows that the system monitor 280 has recorded corresponding breadcrumbs indicating the end of the call and the return of the shopping cart screen 424 to the foreground of the device 230. In addition, the transaction module 270 has updated the checkout transaction in the transaction table 275 to reflect that the application has returned to the foreground, and to the active state.

Referring back to FIG. 3, when a transaction completes successfully, the transaction moves from the active state 305 to the success state 315. Similar to the beginning of the transaction, the successful end of a transaction is detected based on the occurrence of an ending event or based on system calls (e.g., end_transaction("checkout")) from the application. Once the transaction reaches the success state 315, the transaction agent of some embodiments updates transaction information for the successful transaction. The updates to the transaction information may provide a final value for the transaction, a status for the transaction, an ending time for the transaction, etc.

Figure 6A:
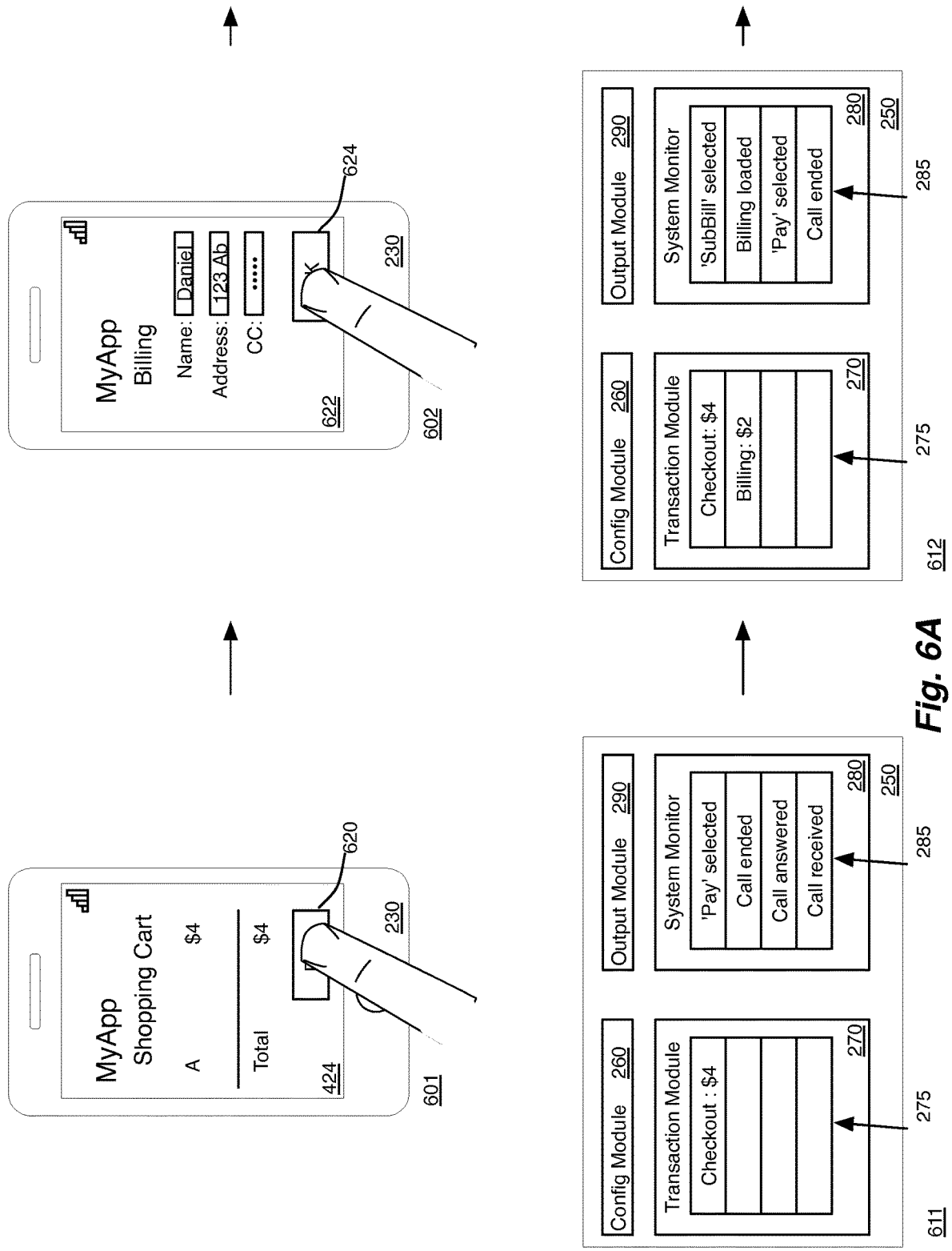
FIGS. 6A-B illustrate an example of a successful transaction on a mobile device.
Figure 6B:
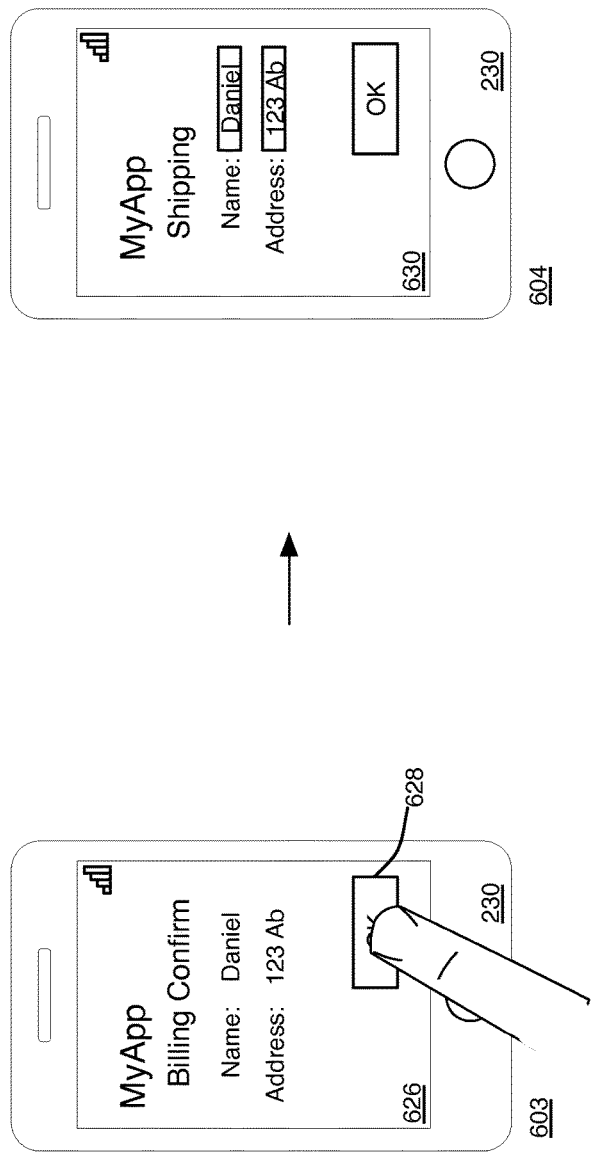

FIGS. 6A-B show an example of a successful transaction on a mobile device. The first UI stage 601 and the first system stage 611 are similar to the fourth UI and system stages 604 and 614 of FIG. 5. However, in the first UI stage 601, the user has selected the UI item 620 on the shopping cart screen 424 to pay for the items in the user's cart. The first system stage 602 shows that the system monitor 280 has added a corresponding entry in the monitor table 285 to reflect the user's selection. The first UI and system stages 601 and 611 show the application in an active state.

The second UI stage 602 shows a billing screen 622 on the mobile device 230. The user has entered their billing information and selects the UI item 624 to submit the billing information and continue with the checkout process. The second system stage 612 shows that the system monitor 280 has updated the monitor table 285 to indicate that the billing screen was loaded and that the UI item 624 was selected.

In addition, the second system stage 612 shows that the transaction module 270 has added a new billing transaction to the transaction table 275. The billing transaction begins when the user clicks the UI item 624 in the second UI stage 602. As shown in this example, transactions are not necessarily sequential within an application. Transactions may overlap or be nested within each other, allowing for multiple different transactions to be monitored at a given time. The second system stage 612 also shows that the billing transaction has been assigned an initial value of $2. As described above, the developer may assign different values to different transactions in an application.

The third UI stage 603 shows a billing confirmation screen 626 that is shown after a user submits their billing information. In the third UI stage 603, the user selects the UI item 628 to allow a user to confirm that the entered billing information is correct. In this example, the billing transaction ends successfully when the user selects the UI item 628 to confirm the billing information.

Although in this example, the billing transaction seems like a trivial transaction to monitor, the billing transaction may include several operations that are not reflected in the UI of the application that may fail or cause problems. For example, submitting the billing information may include retrieving user information from an application server, verifying the billing information with a third party service, generating an invoice, sending a confirmation email, etc.

In the third system stage 603, the system monitor 280 has updated the monitor table 285 to indicate the loading of the confirmation screen 626 and the selection of UI item 628 to submit the billing confirmation and end the billing transaction. When the billing transaction ends, the transaction module 270 of some embodiments updates the transaction to reflect the ending time for the transaction, a status (e.g., successful, slow, etc.), and a final value. The final value in some embodiments is a result of several operations (e.g., adding items to a shopping cart) during the transaction.

The fourth UI stage 604 shows a shipping screen 650 for entering shipping information for the user's purchase. The billing transaction has completed successfully, but the checkout transaction is still active. The fourth system stage 614 shows that the transaction module has removed the billing transaction from the transaction table 275. In some embodiments, the transaction agent 250 sends the transaction data for completed transactions to the transaction server for processing and presentation to the developer. Sending the transaction data (and the secondary data) to the transaction server will be described in greater detail below with reference to FIG. 8.

In some cases, a transaction does not reach a success state 315. A transaction may reach an unsuccessful state for several different reasons. Referring back to FIG. 3, when a transaction does not complete successfully, the transaction moves from the active state 305 (or the inactive state 310) to an unsuccessful state (i.e., timeout state 320, failed state 325, and crash state 330).

In some embodiments, the transaction reaches a timeout state 320, when the transaction takes too long to complete. The transaction of some embodiments times out when the transaction takes longer than a timeout value that is specified for the transaction. As described above, in some embodiments a transaction times out based only on the time spent in the active state, or while the application is in the foreground. Alternatively or conjunctively, the timeout value is specified for the total elapsed time of the transaction, not just the time when the application is in the foreground. In some embodiments, the configuration for the transaction specifies a separate timeout value for the total elapsed time and the foreground time for each transaction. In such cases, a transaction may time out even when the transaction is in the inactive state 310.

The transactions of some embodiments reach an explicit failed state 325 when a transaction fails because of an error that occurs in the application or on the mobile device. In some cases, the error is an error that is expected by the developer (e.g., a network calls because connection to the network is lost) and the transaction is explicitly failed using an SDK call from the error handler in the source code. As another example, in some instances the transaction fails because the user abandons the transaction before the transaction is able to complete. A user may enter several items into a shopping cart, but then decide that he no longer wants the items and exit the application. In such cases, the transaction fails, but the application is able to recover and the transaction agent continues to monitor the application for other transactions.

Figure 6B:
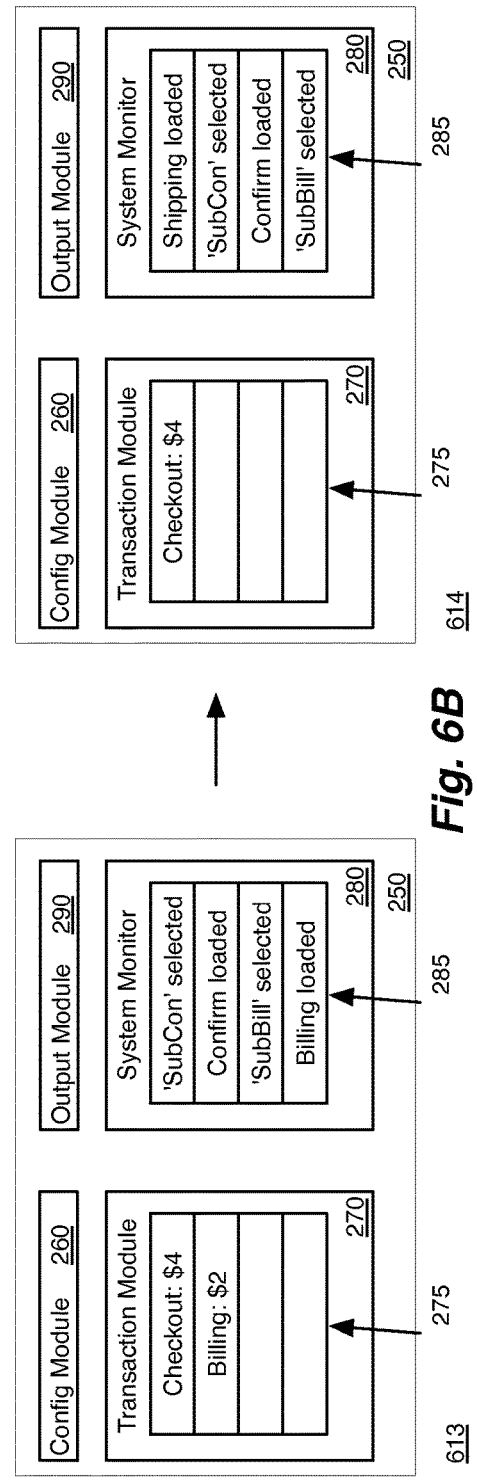
Figure 7:
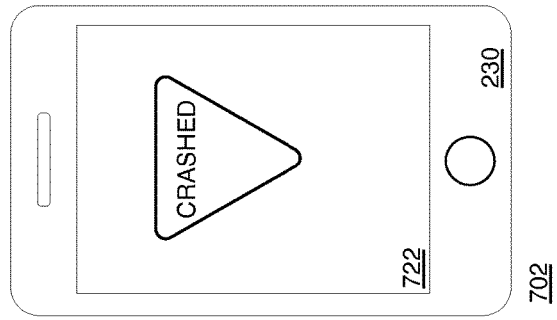
FIG. 7 illustrates an example of a failed transaction on a mobile device.
Figure 7:
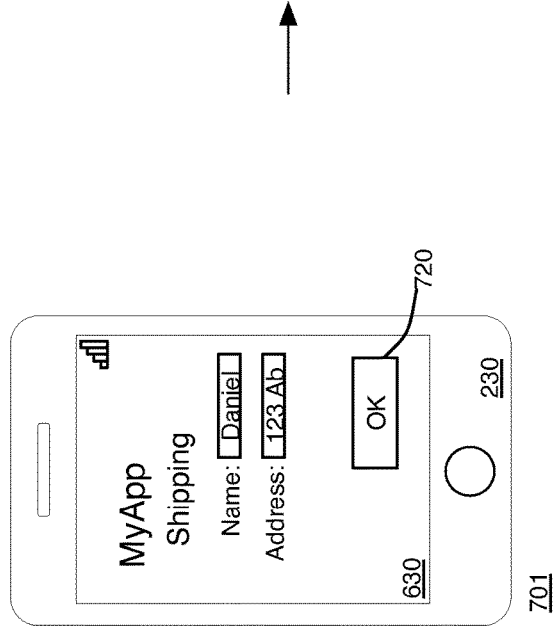
Figure 7:
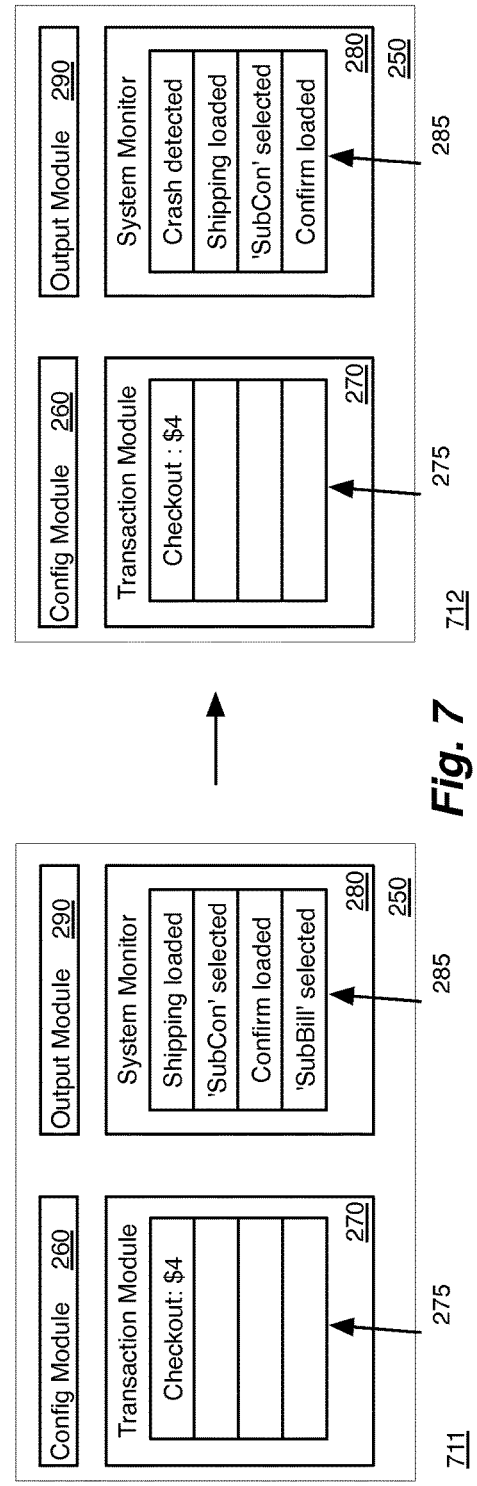

When the application is unable to handle errors or the application and/or device is otherwise unable to recover, the application and/or device crashes and the transaction reaches a crash state 330. FIG. 7 illustrates an example of a crashed transaction on a mobile device in two UI stages 701-702 and four system stages 711-712. The first UI and system stages 701 and 711 are similar to the fourth UI and system stages 604 and 614 of FIG. 6. However, in the first UI stage 601, the user selects the UI item 720 to submit the entered shipping information.

In the second UI stage 702, the mobile device 230 shows a crash screen 722, which indicates that the application (or the device 230) has crashed. In the second system stage 712, the system monitor 280 has recorded a breadcrumb in the monitor table 285 to indicate the crash. In some embodiments, the system monitor 280 of some embodiments includes a crash monitor (not shown) that saves a crash log, or report, each time the application crashes to be sent to the transaction server along with the transaction data and secondary data. In some embodiments, the system monitor 280 retrieves a crash log from an external source, such as from the system logs of the mobile device.

In some embodiments, the transaction agent 250 does not update each transaction in the event of a crash, but rather sends the transaction data with a crash report to the transaction server, which maps the crash data and the transaction data to update the transactions. Alternatively or conjunctively, the transaction agent 250 detects the crash, updates the status of any remaining incomplete transactions as failed, and marks the time of the crash as the end timestamp for the checkout transaction. Although the transactions and breadcrumbs in the tables 275 and 285 are shown with very minimal information, it is understood that the tables 275 and 285 could store many other fields (e.g., timestamps, status, etc.) regarding the entries in the tables 275 and 285.

In the failed state 325, the transaction agent marks the transaction as failed and updates the end timestamp of the transaction with the time of the failure. When the failure is specific to a particular transaction, the transaction agent marks the particular transaction as failed, but continues to monitor any remaining transactions. However, when the failure is more general, such as when the application or mobile device crashes, the transaction agent of some embodiments marks all of the remaining incomplete transactions as failed and updates the end time for all of the transactions with a timestamp of the crash.

Once a transaction completes (whether successfully or not), the transaction enters a buffer state 335 when the transaction agent of some embodiments adds the transaction to a buffer. The transaction agent of some embodiments uses the buffer to batch a set of transactions together before sending the transactions to a transaction server. In some embodiments, the transaction agent buffers a particular number of transactions, or buffers all transactions for a particular period of time.

When the transaction is ready to be reported to the transaction server, the transaction moves to a reporting state 340, in which the transaction agent sends all of the collected information (e.g., transaction data, secondary data, device data, etc.) about the buffered transactions from the mobile device to a transaction server for processing.

Figure 8:
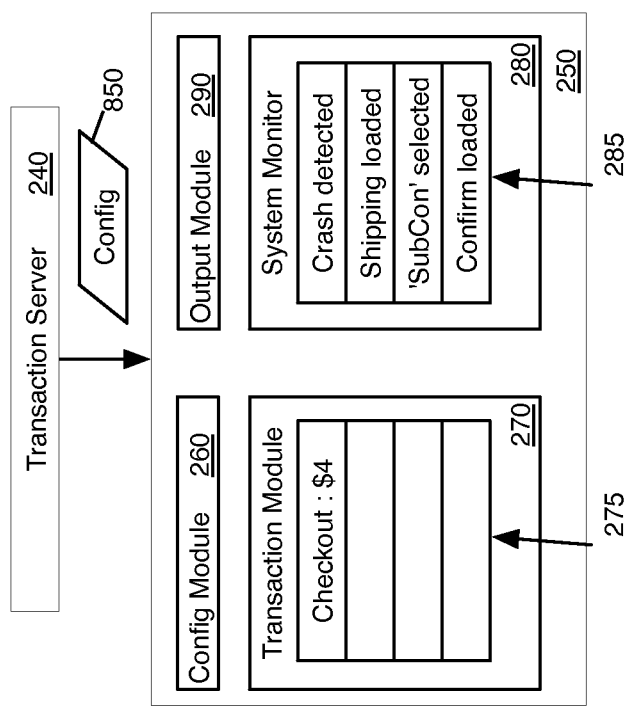
FIG. 8 illustrates an example of reporting transaction data to the transaction server.

FIG. 8 illustrates an example of reporting transaction data to the transaction server. This figure shows the transaction server 240 and the transaction agent 250, as described above with reference to FIG. 2. The transaction agent includes the configuration module 260, the transaction module 270, the system monitor 280, and the output module 290. In addition, the transaction agent 250 includes a crash monitor 820.

The output module 290 collects the transaction data, as well as any secondary data (e.g., breadcrumbs, system state data, etc.) from the tables 275 and 285. Although the information is described as being stored in a pair of tables 275 and 285, it should be understood that this is merely to simplify the explanation, and is not meant to limit the invention in any way. All of the data may be stored in a single data storage or may be distributed over a series of storages and databases in some embodiments. The different storages may include storages maintained by the application as well as storages maintained by other applications or by the device itself.

Once the transaction data and the secondary data are collected, the output module 290 sends the transactions and the associated data 850 to the transaction server 240. The output module 290 of some embodiments sends the successful transaction data in batches, rather than sending each transaction as it completes. In some of these embodiments, the transactions are sent at specified intervals, or when a threshold number of transactions are ready to be sent to the server.

In some embodiments, the secondary data is bundled with the transaction data for successful transactions. The output module 290 of some embodiments retrieves any breadcrumb with a timestamp that is within the range of the earliest begin timestamp and the latest end timestamp for the transactions in the batch. For example, if the earliest transaction in a particular batch begins at a time, t0, and the last transaction in the batch ends at t1, any breadcrumb with a timestamp between t0 and t1 would be sent to the transaction server with the particular batch of transactions. The breadcrumbs are then individually associated with each transaction at the server 260.

When the application or device fails (putting the transaction agent into the fail state), the output module 290 of some embodiments, in addition to collecting the transaction and secondary data, collects crash data (or a crash report) related to the failure of the transaction. In some embodiments, when there is a crash during a transaction, the transaction data and the secondary data are sent to the transaction server as a part of the crash report. In some embodiments, the output module 290 attaches the transaction and breadcrumb data to the crash report data so that the crash report can be handled by a crash pipeline at the transaction server 240 before associating the crash data with the transaction and breadcrumb data. In some of these embodiments, the crash reports include data that is gathered from a system crash report that is generated by the mobile device.

The output module 290 of some embodiments sends the transaction, secondary, and crash data 850 for failed transactions to the transaction server 240 immediately after the crash is detected. When the output module 290 is unable to send (e.g., when the device has crashed, network connectivity is lost, etc.), the output module 290 of some embodiments sends the data 850 whenever possible (e.g., when network connectivity is restored, the application is restarted, etc.).

The transaction server processes, analyzes and presents the collected data 850 to a developer. The developer can then view and analyze the captured breadcrumb and system data to identify any issues (e.g., performance issues, error issues) that end-users are having with the application. Based on the breadcrumbs and crash reports associated with the transaction data, a developer can have a better understanding of the series of events that occurred prior to crash. As the transaction agent 250 operates on such different types of devices and different types mobile OSs, the developer can have a more complete view of the performance of the developer's application(s) and identify areas that need improvement. The transaction server 240 is described in further detail below in Section II.

II. Transaction Server

Figure 9:
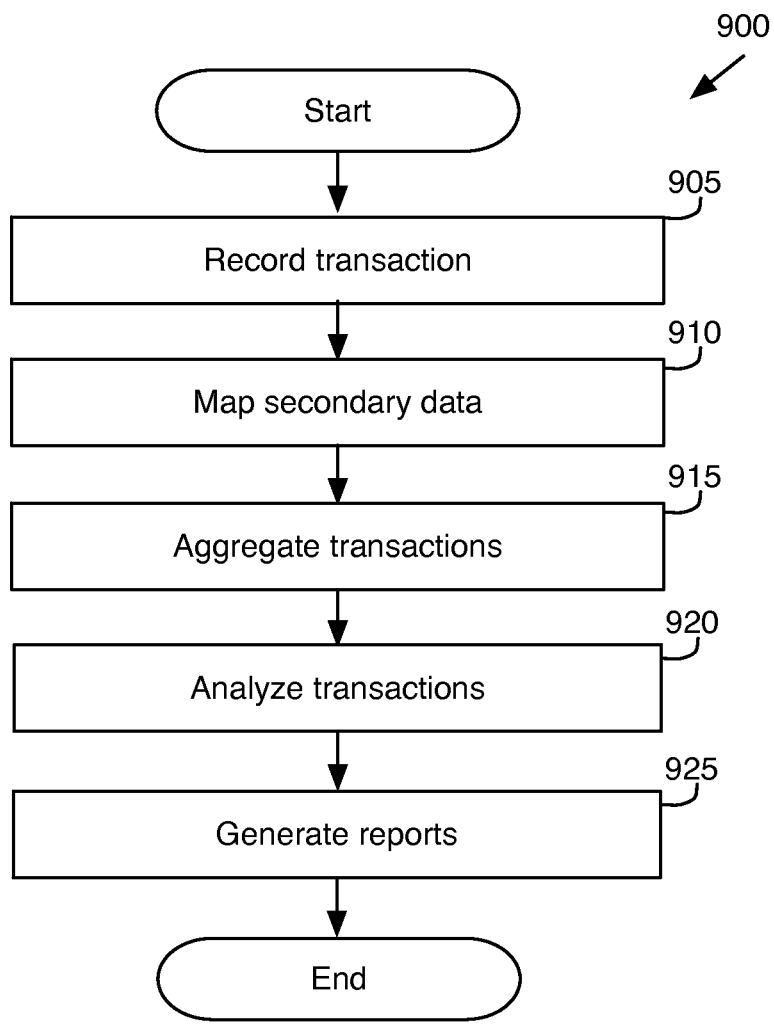
FIG. 9 conceptually illustrates a process for processing transaction data.

FIG. 9 conceptually illustrates a process for processing transaction data. The process 900 is performed in some embodiments by a transaction server such as the one described below with reference to FIG. 10. The process 900 of FIG. 9 begins by recording (at 905) transaction data for the transactions to a transaction storage.

Once the transactions are recorded, the process 900 maps (at 910) secondary data (e.g., system data, breadcrumbs, etc.) and crash data to the individual transactions recorded at each mobile device. By associating the secondary and crash data to the transactions, the transaction server of some embodiments is able to provide complete and specific information regarding various transactions executing on the mobile devices.

In some embodiments the process maps (at 910) the breadcrumbs to the transactions by identifying any of the received breadcrumbs that have timestamps that fit within the range of the start and end timestamps for a transaction. For example, if a transaction begins at time t3 and ends at time t6, and breadcrumbs are recorded at times t1, t4, t6, and t7, the breadcrumbs at t4 and t6 are mapped, or associated, with the transaction.

The process 900 aggregates (at 915) the received transaction data to facilitate reporting and analysis on the data. The process 900 of some embodiments aggregates (at 915) the data at different levels, such as by platform, application version, time period, etc. While the aggregated data loses some of the detail and specificity of the individual transactions, it allows a developer to quickly pinpoint problem areas by providing a summarized view to identify trends in the data.

For example, the process 900 of some embodiments aggregates the transactions into 1 minute intervals, aggregating the data for all of the transactions that occur within each minute into a single record that summarizes the transactions for that minute. In some embodiments, rather than a single record, the transactions may be aggregated into separate records for different groupings of the transaction data (e.g., by mobile OS, application version, failed/successful transactions, etc.).

In some embodiments, the aggregated data is further aggregated into larger time segments (e.g., 10 minutes, hourly, daily, etc.). By aggregating the data, a developer is able to identify trends in the data, such as the effects of changes made in different versions of an application or on different mobile OSs.

The process 900 of some embodiments then analyzes (at 920) the transactions to identify information that may be useful to the developer. For example, the process 900 may identify breadcrumbs or system events that occur with a high frequency in failed transactions that are less common in the successful transactions. In some embodiments, the process 900 analyzes the transaction data to recommend other potentially useful transactions for a developer to monitor.

In some embodiments, the process 900 then generates (at 925) reports, or views, of the transaction data to present to the developer. The views of the transaction data are presented at many different levels and are customizable to serve the different needs of various entities at the developer of the application. For example, a highly aggregated view of at-risk transactions may be provided to a business manager, while a software developer may have access to specific crash reports and system calls to troubleshoot portions of the application code.

Figure 10:
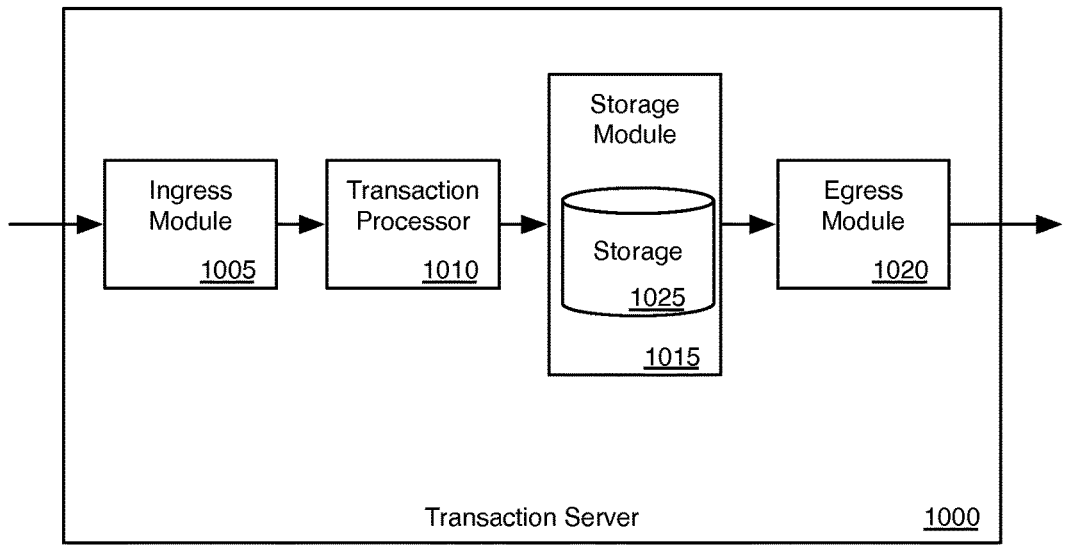
FIG. 10 illustrates an example software architecture of a transaction server for receiving, processing, storing, and providing transaction data.

FIG. 10 illustrates an example software architecture of a transaction server of some embodiments. The transaction server 1000 serves as a central repository for the transaction data. Although shown as a single server, the transaction server 1000 of some embodiments is a group of servers for receiving, processing, and providing the transaction data for a developer of an application. The transaction server 1000 includes an ingress module 1005, a transaction processor 1010, a storage module 1015, and an egress module 1020.

The ingress module 1005 initially receives transactions from transaction agents executing on various different mobile devices that are running the application. In some embodiments, the ingress module 1005 includes multiple processing pipelines. The ingress module 1005 receives the successful transactions from the output module of the transaction agents on the mobile devices (not shown) along a first pipeline and receives failed or crashed transactions from a crash processor on the transaction server along a second pipeline that first processes crash reports received from the mobile devices before sending the associated transactions to be recorded in the transaction storage.

The transaction processor 1010 processes the received transactions by associating the transactions with secondary data (including crash report data), and aggregating the data for analysis and reporting.

The storage module 1015 interfaces with the storage 1025 to store and retrieve transaction data. To simplify the description, only one storage 1025 is shown in the transaction server 1000 of FIG. 10, but in some embodiments, the storage module 1015 uses database shards to distribute a database over multiple database servers to increase performance with high volumes of data. In addition, the data may be stored at different locations (e.g., at different data centers). The data may also be accessed using standard Structured Query Language (SQL), using a NoSQL mechanism, or using some other data access protocol. The egress module 1020 produces output, such as reports, to be viewed by a developer.

Although the egress module 1020 is illustrated as a module of the transaction server 1000, in some embodiments the egress module 1020 is implemented as a separate set of servers or web portals that access the data of the transaction server 1000 to provide the transaction data to a developer. Each of these modules is described in further detail below.

A. Ingress

Figure 11:
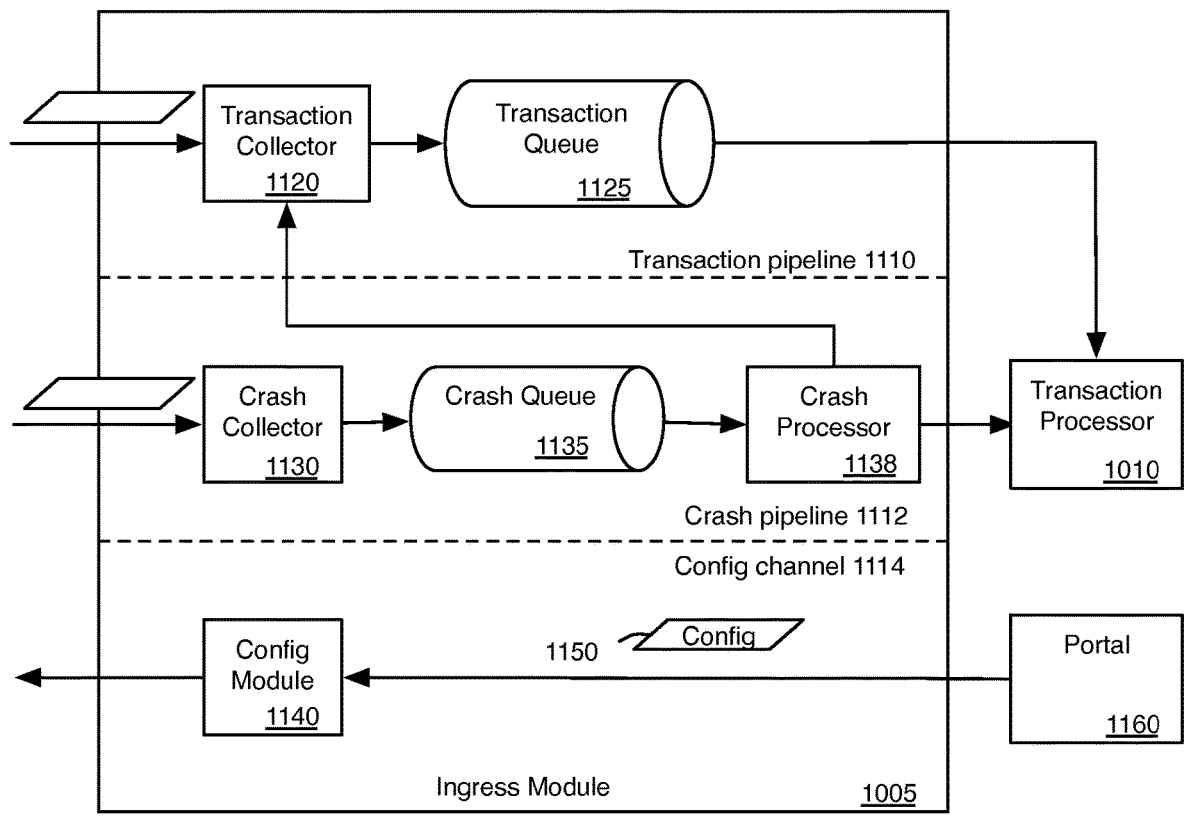
FIG. 11 illustrates an example software architecture of an ingress module of a transaction server.

FIG. 11 illustrates an example software architecture of an ingress module of a transaction server. The ingress module 1005 is for communicating with the transaction agents of the mobile devices. The ingress module 1005 includes a transaction pipeline 1110, a crash pipeline 1112, and a configuration channel 1114. The configuration channel 1114 of some embodiments is for communicating configuration data from the transaction server to the transaction agents. The configuration channel 1114 includes a configuration module 1140. In some embodiments, the configuration module 1140 prepares configuration data to be sent to the transaction agents for an application based on transaction settings specified by developers of the application. In some embodiments, the developer specifies different transaction settings (e.g., boundaries, timeouts, slow threshold values, etc.) through a portal 1160 or other user interface (e.g., web client 105 described with reference to FIG. 1) that communicates with the transaction server. The configuration channel 1114 and the configuration module 1140 take the configuration data 1150 and distribute it to the transaction agents of the various mobile devices.

In some embodiments, data regarding transactions performed by applications on mobile devices is received along different pipelines, depending on whether or not the transactions crash or fail before completion. Transactions that do not crash are sent along the transaction pipeline 1110, but transactions that crash are sent along the crash pipeline 1112.

The transaction pipeline 1110 includes a transaction collector 1120 and a transaction queue 1125. The transaction collector 1120 receives the successful transaction data along with secondary data, such as breadcrumbs, system state data, etc. The transaction collector 1120 collects the data and sends it to a transaction queue 1125 to be further processed by the transaction processor 1010.

In some embodiments, the transaction queue 1125 is implemented by a software component that distributes the processing of the transactions to different transaction processors. The transaction queue 1125 may distribute the work in sequence to the next available transaction processor following a round robin dispatching scheme or some other dispatching scheme.

Transactions that do not complete successfully are received by the crash pipeline 1112. FIG. 11 shows that the crash pipeline 1112 includes a crash collector 1130, a crash queue 1135, and a crash processor 1138. The crash collector 1130 and crash queue 1135 are similar to the transaction collector 1120 and transaction queue 1125 of the transaction pipeline 1110. The crash collector 1130 also receives the transaction data and secondary data for crashed transactions, but unlike the transaction collector 1120, the crash collector 1130 of some embodiments also receives crash report data from the transaction agents.

In some embodiments, when the crash report is received, the crash collector 1130 enqueues the crash report in a crash queue 1135 to be processed by one or more crash processors 1138. The crash processor 1138 may process a stack trace of code, and if necessary, enqueue another task (e.g., in the crash queue 1135) if the stack trace require further processing by another crash processor 1138. The crash processor 1138 of some embodiments reads the crash report to write data relating to the crash to storage. For instance, the crash processor 1138 may read the crash report to extract raw crash data and crash metadata.

Once the crash processor 1138 has completed processing the crash report, the crash processor 1138 of some embodiments sends the crash data to the transaction processor 1010 and sends the transaction data and the secondary data to the transaction collector 1120 to be collected and queued, before being processed by the transaction processor 1010. By maintaining a separate pipeline for successful and failed transactions, the transaction server of some embodiments is able to provide a single entry point for all crash reports, whether they are related to transactions or not, ensuring consistent processing of crash reports and transactions through the system.

B. Transaction Processor

Figure 12:
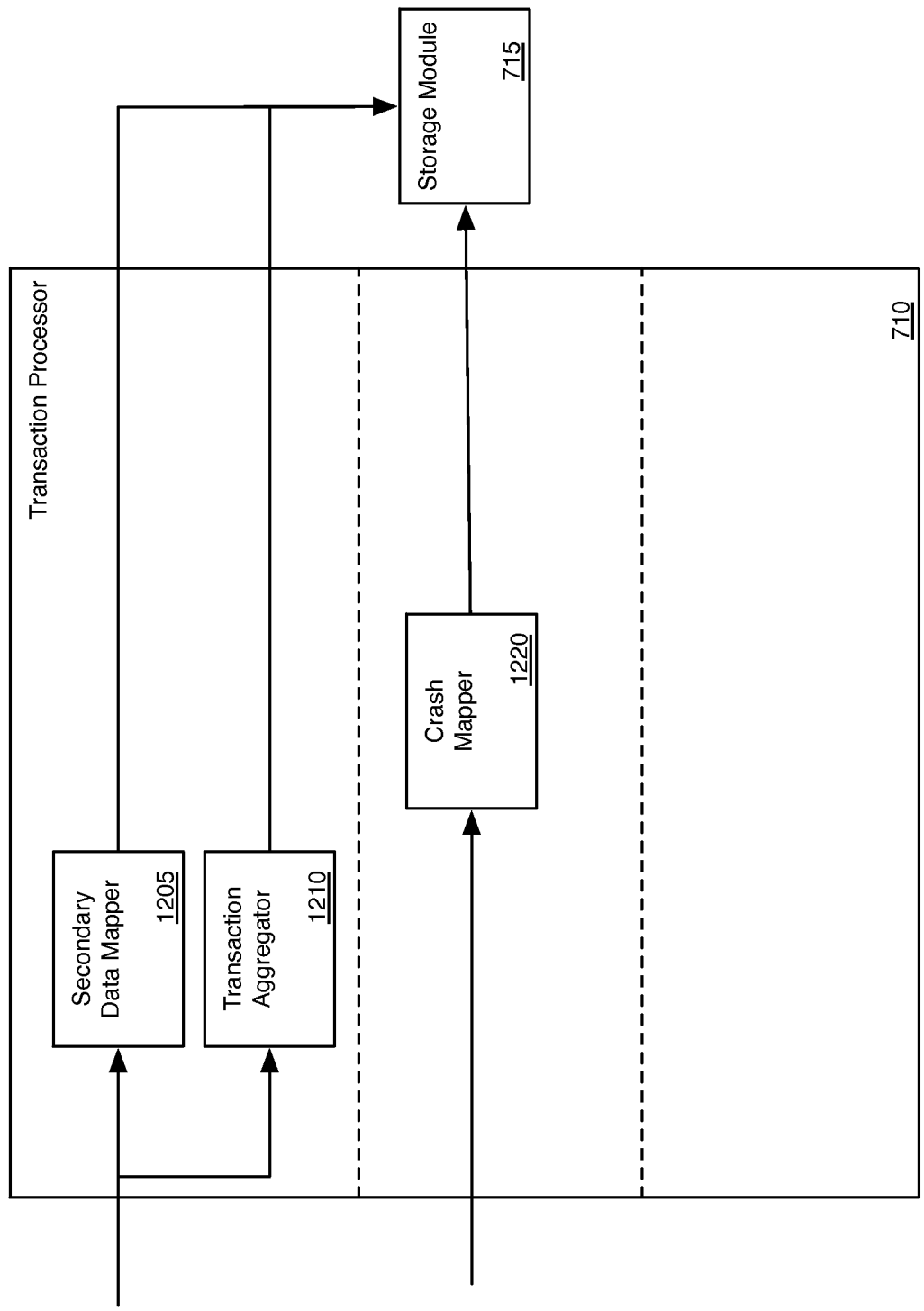
FIG. 12 illustrates an example software architecture of a transaction processor of a transaction server.

FIG. 12 illustrates an example software architecture of a transaction processor of a transaction server. The transaction processor 710 processes the transactions and all the secondary data before storing the data with the storage module 715. The transaction processor 710 includes a secondary data mapper 1205, a transaction aggregator 1210, and a crash mapper 1220.

The secondary data mapper 1205 maps secondary data to transaction data received through the transaction pipeline 1110. The secondary data mapper 1205 associates the secondary data with the transactions to provide a developer with a more complete view of the context and events that occur with each transaction.

The crash mapper 1210 performs a similar function to the secondary data mapper 1205, but for crash data received, for example, from the crash processor 1138 of FIG. 11. The crash data is mapped to the transactions so that a developer is able to view crashed transactions and identify problems with the different transactions based on the received crash data.

FIGS. 13 A-B illustrate an example of mapping collected secondary and crash data to transactions in three stages 1301-1303. The collected secondary and crash data of some embodiments includes crash report data and breadcrumb data received from transaction agents running with the applications on each of several mobile devices.

The first stage 1301 illustrates a transaction table 1305 that stores transaction data on a transaction server. The transaction table 1305 stores various information, such as a name or type for the transaction, the beginning and end times, a status of the transaction, a value for the transaction, and more. In some embodiments, the transaction table 1305 also includes a foreground time and a background time for each transaction, tracking the amount of time the application spent in the foreground and the background of the device for the duration of the transaction. In particular, the first entry in the transaction table 1305 shows a billing transaction that has completed successfully, and the second entry in the transaction table 1305 shows a checkout transaction that has failed.

The first stage 1301 also shows a crash table 1310 that stores various crash data. In some embodiments, the crash data is received from a crash monitor of the transaction agent that is executed on each mobile device. The crash table stores various information, such as a type for the crash, a timestamp for when the crash occurred, etc.

The crash data in the crash table 1315 is then mapped to the transaction data in the transaction table 1305, associating the crash data with the related transactions. The mapping of some embodiments creates an association with a crash report, allowing a developer to reference a corresponding crash report for a given transaction. By associating the crash data with the transactions, a developer is able to view data related to crashes during a particular transaction to troubleshoot the transaction by identifying events and stack traces that may cause problems within a particular transaction.

The second stage 1302 shows a resulting mapped table 1315 of the mapping of the transaction table 1305 with the crash table 1310. In particular, the mapped table 1315 shows that the end time for the second checkout transaction has been updated with the timestamp of the crash with ID 1, the status has been updated to Crashed, and the CrashID for the second transaction has been updated to 1.

The second stage 1302 further shows a secondary data table 1320. The secondary data table 1320 stores breadcrumbs, system state data, and other secondary data related to the various transactions. The secondary data table 1320 is populated with the various secondary data received from the transaction agents.

The secondary data in the secondary data table 1320 is then mapped to the mapped table 1315, associating the secondary data with the related transactions. By associating the secondary data with the transactions, a developer is able to view breadcrumbs and other secondary data related to a particular transaction to analyze the transaction by looking for patterns in the events or circumstances (e.g., operating system, application version, etc.) that affect the performance of the transaction within the application.

The third stage 1303 shows a final mapped table 1325 that stores the results of mapping the crash data and the secondary data to the various transactions. The final mapped table 1325 shows that the first billing transaction is not associated with any crash because it completed successfully, but is associated with the secondary events (i.e., breadcrumb 97) that occurred between the start time (i.e., 12:47:09) and end time (i.e., 12:48:09) of the first billing transaction. The second checkout transaction is associated with a crash (i.e., crash 1) and with secondary events (i.e., breadcrumbs 98-100). One skilled in the art will recognize that the data structures described are as an example and that the different transactions and secondary data may be mapped and associated with each other in many different ways.

Referring back to FIG. 12, the transaction aggregator 1210 aggregates the transaction data into different groups. In some embodiments, the transaction aggregator 1210 aggregates the data into groups (e.g., by platform, application version, etc.) in various time increments, such as in minute, hourly, or daily intervals to provide high-level views of the transaction data, allowing for faster access and analysis. In some embodiments, there is a large volume of transaction data and aggregating the data into multiple tables or sub-tables allows for faster processing of the data and provides a manageable description of the transaction data.

FIG. 14 illustrates an example of aggregating transaction data. The transactions can be aggregated by time, application, application version, device type, etc. Specifically, this figure shows the aggregation of transaction data to minute-level data in two stages 1401 and 1402.

The first stage 1401 shows an example of transaction data from a transaction table 1405 similar to the final mapped table 1325 of FIGS. 13 A-B. The transaction data includes a name or type for each transaction, a timestamp for when the transaction began, a status for the transaction, a value for the transaction, and more.

The second stage 1402 shows an example of the transaction data of the first stage 1401 that has been aggregated into minute-level data in an aggregated table 1410. In this example, all of the data for each type of transaction has been grouped into a single entry. However, the data of some embodiments is aggregated according to different groups of attributes to provide different levels of specificity. For example, in some embodiments, the data is grouped by transaction type, mobile OS, and application version, in order to allow a developer to compare the performance of transactions in different versions of an application running on different mobile OSs. The data of some embodiments is grouped according to other attributes, such as device type, manufacturer, model, whether the transaction was slow, etc.

Once the transaction data has been processed by the transaction processor 710, the data is sent to a storage module 715 for storage. Although described as a separate module, it should be understood that the storage module 715 is involved in many of the operations of the other modules. For example, the transaction processor 710 of some embodiments performs the mapping and aggregating of the transaction data by accessing and storing the data in a storage through the storage module 715.

C. Storage Module

Figure 15:
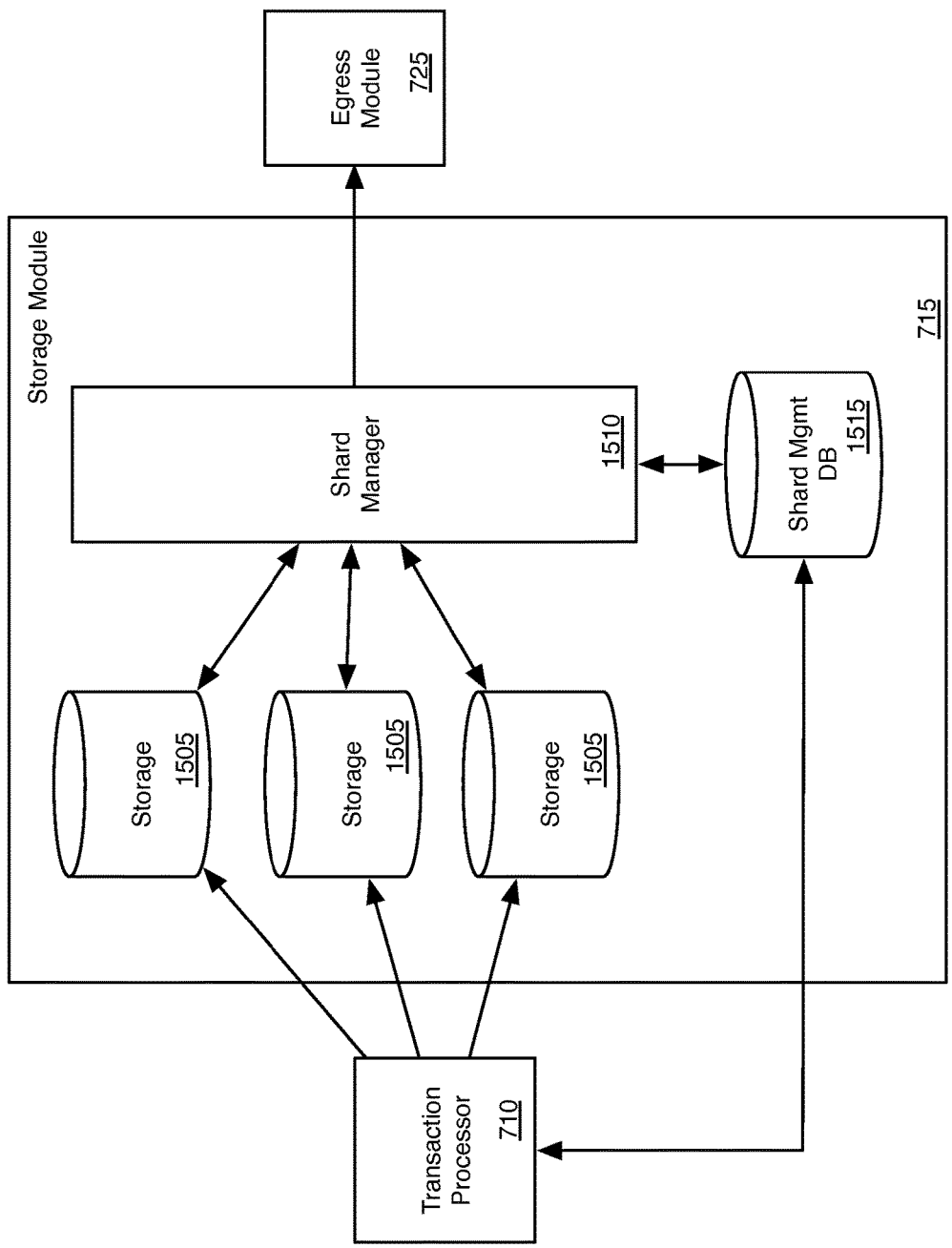
FIG. 15 illustrates an example software architecture of a storage module of a transaction server.

FIG. 15 illustrates an example software architecture of a storage module of a transaction server. The storage module 715 includes three storage units 1505, shard manager 1510, and a shard management database 1515.

The three storage units 1505 of some embodiments store different portions, or shards, of the transaction data. In some embodiments, each shard represents a different logical portion of the transaction data. For example, in some embodiments, each shard stores information for different applications on separate shards in the storage units. The logical divisions of the data may be divided in many different ways, depending on the needs of the developer. In some embodiments, the transaction server provides a service to several different developers, each with several different applications. In some such embodiments, each shard stores information for the applications of a different developer.

The shard manager 1510 is for accessing data stored on the storage units 1505. In some embodiments, the shard manager 1510 is implemented using a database partitioning system. The shard manager 1510 divides the data among the different storage units and maintains information about the distribution in a shard manager database 1515, allowing for faster access as the processing for the retrieval is divided amongst multiple processing units. Although the shard manager 1510 is able to provide faster read access to the storage units 1505 by distributing the data over several machines, the partitioning of the data slows write access to the storage units.

In some embodiments, the storage module 715 allows the transaction processor 710 or ingress module (not shown) to write directly to the storage units, rather than through the shard manager 1510. In such embodiments, the transaction processor 710 directly accesses the shard management database 1515 to determine the proper location for the various transaction data, but then stream writes directly to the appropriate location without interfacing with the shard manager 1510. The stream writes allow for faster access by avoiding transactional processing, which is unnecessary as the transaction processor 710 only adds new transaction data and does not update or remove existing transaction data. The storage module 715 manages the data stored on the transaction server to process the transaction data received from the transaction agents and to present the data to the developer of the application through the egress module 725.

D. Egress Module

Figure 16:
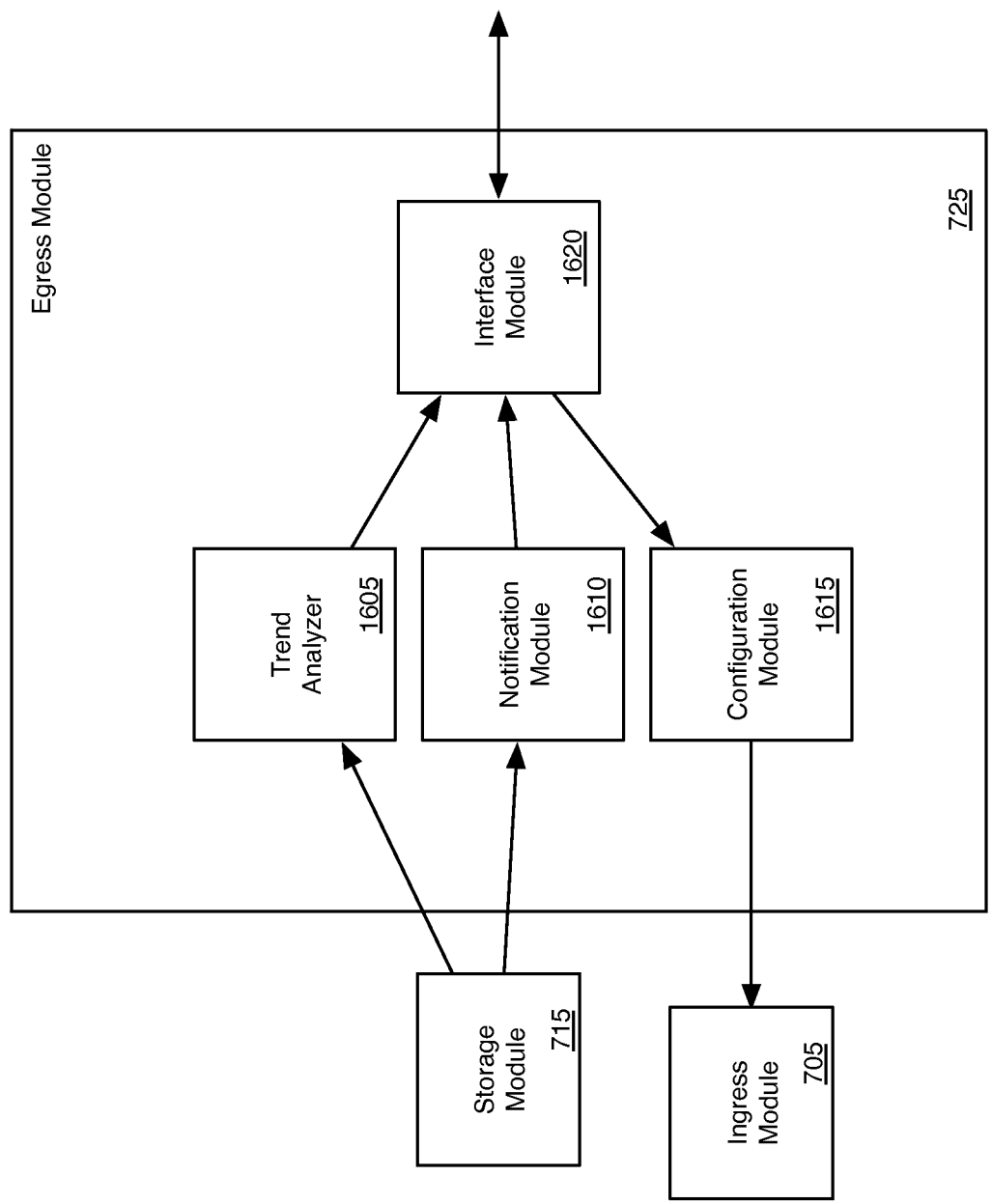
FIG. 16 illustrates an example software architecture of an egress module of a transaction server.

FIG. 16 illustrates an example software architecture of an egress module of a transaction server. In some embodiments, the egress module 725 is a separate server, such as a web portal server, for providing a developer with access to the stored and analyzed data of the transaction server. The egress module 725 of some embodiments provides one or more different crash reports to developers of an application through a web portal client. The egress module 725 includes a trend analyzer 1605, a notification module 1610, a configuration module 1615, and an interface module 1620.

The trend analyzer 1605 analyzes the transaction and secondary data to identify trends in the data. In some embodiments, the trend analyzer 1605 uses the trends to suggest transactions that occur based on the transaction and secondary data, identifying sequences of events that could benefit from being monitored. For example, the trend analyzer of some embodiments identifies a checkout transaction based on network requests that are sent to well-known billing points (i.e., URLs that contain the word "checkout") or common shopping cart screens (i.e., view controllers that contain the word "shoppingCart"). The trend analyzer 1605 of some embodiments provides the analyzed trends to the notification module 1610.

The notification module 1610 of some embodiments identifies problems or irregularities with transactions of an application based on the analyzed data and notifies the application developer of the problem. For example, when the trend analyzer 1605 of some embodiments determines that there are an uncharacteristically high number of crashes associated with a particular transaction, the notification module 1610 sends a notification (e.g., an email, text message, system alert, etc.) to the application developer to alert them of the situation.

The configuration module 1615 of some embodiments receives configurations from a developer and provides the configurations to the ingress module of the transaction server to be sent to the transaction agents on various mobile devices. In some embodiments, various properties of the monitored transactions and the secondary data to be recorded is highly configurable. For example, the definition of each transaction, as well as the timeout and slow threshold values, may be configured and updated by a developer. The developer may also configure the transaction agents to record certain types of secondary data for each transaction. For example, in some embodiments, the configuration module 1615 configures the transaction agent to record all network calls, but to ignore any memory warnings during a particular type of transaction.

The interface module 1620 provides an interface for accessing the transaction data and the configuration of the transaction agents. The interface module 1620 of some embodiments communicates with a web portal to provide and receive information to and from a developer of the application.

III. Example Transaction Reports

Figure 17A:
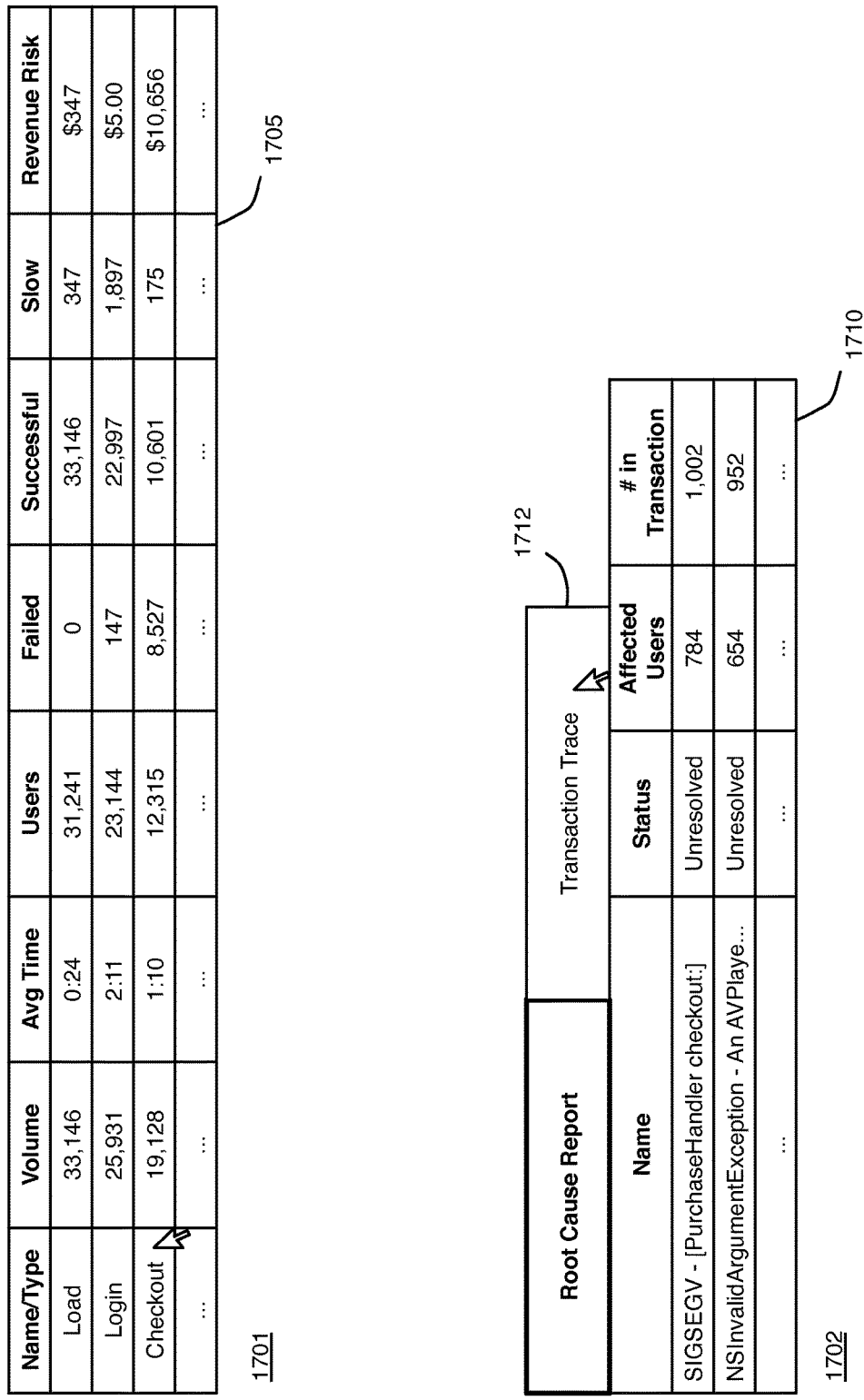
FIGS. 17A-B illustrate an example of analyzing a transaction using a set of transaction reports.
Figure 17B:
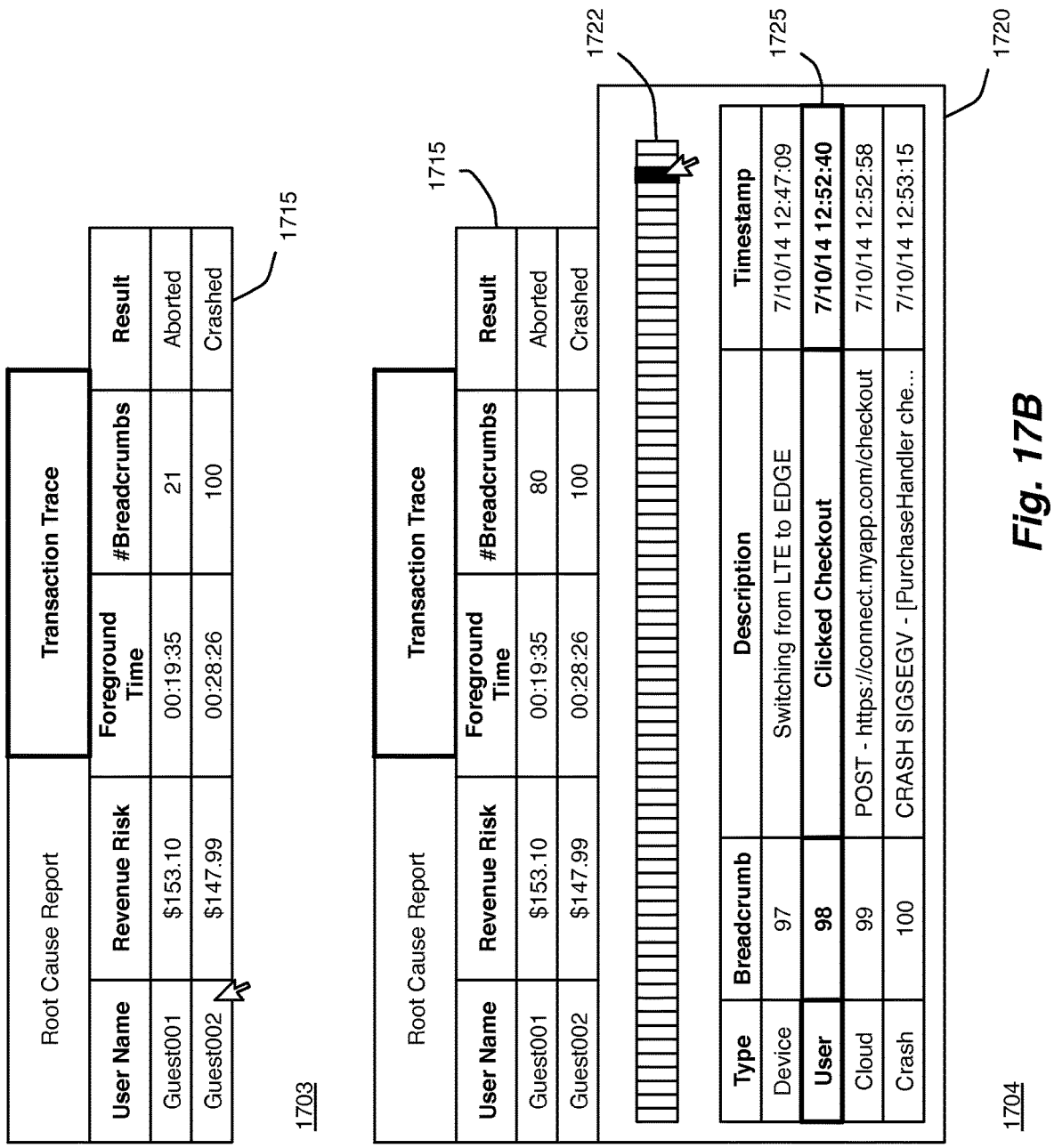

FIGS. 17 A-B illustrate an example of analyzing a transaction using a set of transaction reports that are generated using stored transaction data in four stages 1701-1704. The first stage 1701 shows an example of a summary report 1705 that is presented on a client device (e.g., a web browser) by a developer to view real-time transaction data.

As shown, the summary report 1705 includes an aggregated view of much of the same transaction data described above by reference to FIG. 12. Specifically, the report 1705 shows the name or type of the transaction, the volume of the transaction, the average time for completing the transaction, the number of users that have executed the particular transaction, the number of times that the particular type of transaction failed, succeeded, succeeded slowly, and the total revenue risk presented by the particular type of transaction. In some embodiments, the summary report 1705 includes other summary information (e.g., success rate percentage, a slow transaction rate percentage, etc.).

Based on the revenue risk, a developer viewing the summary report 1705 may determine that the checkout transaction poses the greatest revenue risk and decide to investigate the problem further. The first stage 1701 shows that a developer selects the checkout transaction from the summary report 1705 to view a more detailed view of the particular transaction type.

In this example, the second stage 1702 shows a root cause report 1705 that displays error and exceptions that were triggered in the application during the checkout transaction. The root cause report 1710 further shows the status of the different types of errors and exceptions, as well as the frequency of each error. In this example, the developer decides that these errors and exceptions are not the issue causing the particular problem in the checkout transaction, and selects a button 1712 to view the transaction trace report 1715.

The third stage 1703 shows a transaction trace report 1715. The transaction trace report shows a summary at the user level for the checkout transactions. The transaction trace report 1715 shows records for two users, Guest001 and Guest002. Each record shows the revenue risk for the user, the time that each user spent with the application in the foreground, the number of breadcrumbs recorded, and the end result for each user. In the third stage 1703, the developer sees that Guest001 aborted the transaction, and selects the second record for Guest002.

The fourth stage 1704 shows an expanded view 1720 of the second record in the transaction trace report 1715 for Guest002. Specifically, the expanded view 1720 shows a transaction timeline 1722 and a transaction report 1725.

The transaction timeline 1722 of some embodiments displays a number (e.g., 100) of event icons for each event in the transaction trace report. The event icons are displayed for each user in reverse chronological order, with the most recent events higher in the list. The third stage 1703 shows that the user has placed a cursor over an event icon in the transaction trace report, and the corresponding row in the transaction report 1725 has been highlighted in response.

The transaction timeline 1722 of some embodiments is displayed in one of two different modes, a normalized view and a time-based view. The normalized mode will treat each event equally in the timeline (i.e., the width of the lines that represent each event is normalized). The time-based view scales the event bars in proportion to the duration of the events.

The transaction report 1725 shows the four most recent breadcrumbs recorded by the transaction agent before the crash of the particular transaction. In some embodiments, the developer can configure the reports to show a different number of breadcrumbs. The transaction report 1720 shows a type for each breadcrumb, a breadcrumb ID, a description, and a timestamp. As the developer views the reports and transaction traces at various levels of detail, the developer can identify patterns and problems that need to be addressed.

IV. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 18:
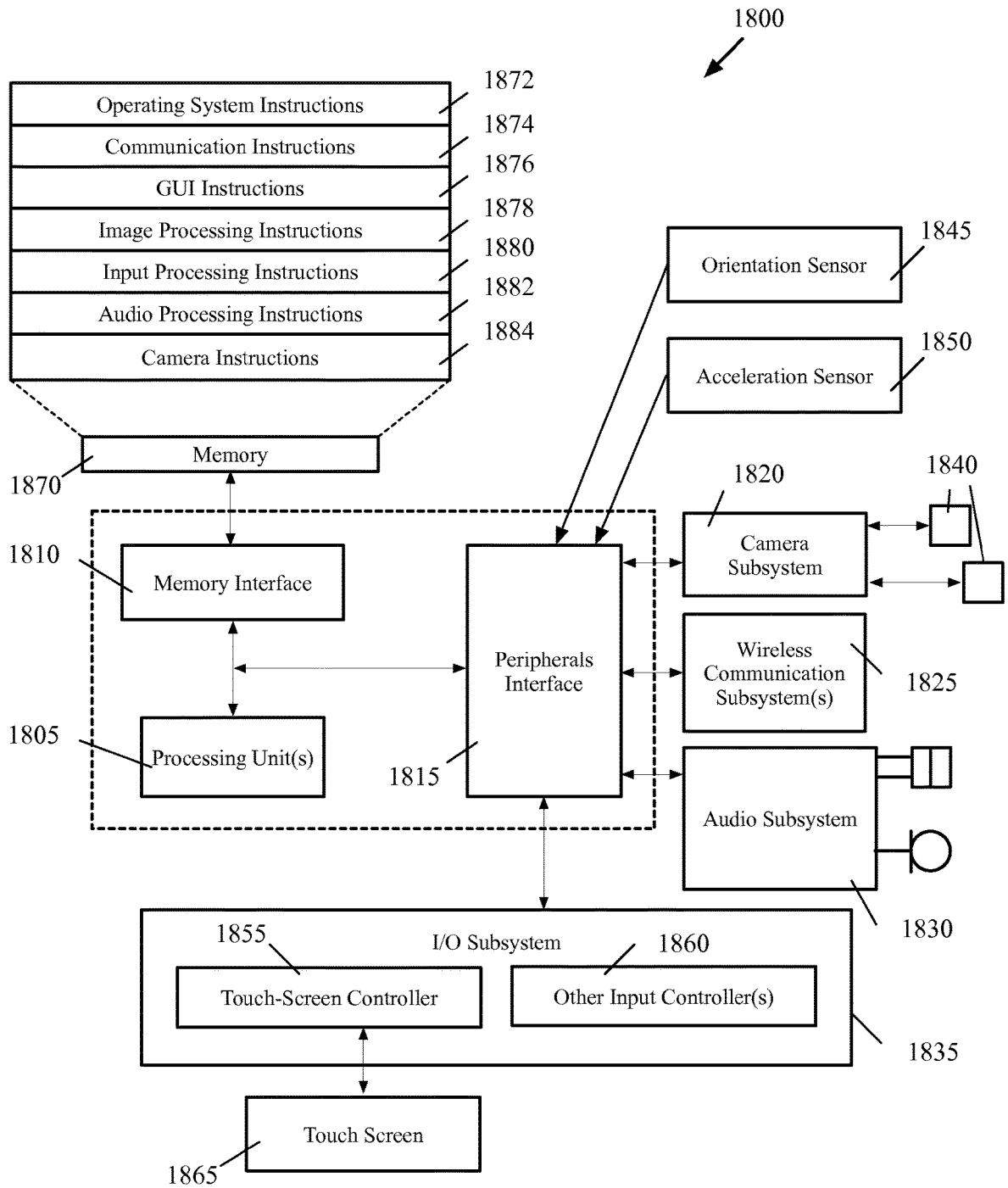
FIG. 18 is an example of an architecture of a mobile computing device.

The crash monitor of some embodiments operates on mobile devices. The applications of some embodiments operate on mobile devices. FIG. 18 is an example of an architecture 1800 of such a mobile computing device. Examples of mobile computing devices include smartphones, tablets, laptops, etc. As shown, the mobile computing device 1800 includes one or more processing units 1805, a memory interface 1810 and a peripherals interface 1815.

The peripherals interface 1815 is coupled to various sensors and subsystems, including a camera subsystem 1820, a wireless communication subsystem(s) 1825, an audio subsystem 1830, an I/O subsystem 1835, etc. The peripherals interface 1815 enables communication between the processing units 1805 and various peripherals. For example, an orientation sensor 1845 (e.g., a gyroscope) and an acceleration sensor 1850 (e.g., an accelerometer) is coupled to the peripherals interface 1815 to facilitate orientation and acceleration functions.

The camera subsystem 1820 is coupled to one or more optical sensors 1840 (e.g., a charged coupled device (CCD) optical sensor, a complementary metal-oxide-semiconductor (CMOS) optical sensor, etc.). The camera subsystem 1820 coupled with the optical sensors 1840 facilitates camera functions, such as image and/or video data capturing. The wireless communication subsystem 1825 serves to facilitate communication functions. In some embodiments, the wireless communication subsystem 1825 includes radio frequency receivers and transmitters, and optical receivers and transmitters (not shown in FIG. 18). These receivers and transmitters of some embodiments are implemented to operate over one or more communication networks such as a GSM network, a Wi-Fi network, a Bluetooth network, etc. The audio subsystem 1830 is coupled to a speaker to output audio (e.g., to output different sound effects associated with different image operations). Additionally, the audio subsystem 1830 is coupled to a microphone to facilitate voice-enabled functions, such as voice recognition, digital recording, etc.

The I/O subsystem 1835 involves the transfer between input/output peripheral devices, such as a display, a touch screen, etc., and the data bus of the processing units 1805 through the peripherals interface 1815. The I/O subsystem 1835 includes a touch-screen controller 1855 and other input controllers 1860 to facilitate the transfer between input/output peripheral devices and the data bus of the processing units 1805. As shown, the touch-screen controller 1855 is coupled to a touch screen 1865. The touch-screen controller 1855 detects contact and movement on the touch screen 1865 using any of multiple touch sensitivity technologies. The other input controllers 1860 are coupled to other input/control devices, such as one or more buttons. Some embodiments include a near-touch sensitive screen and a corresponding controller that can detect near-touch interactions instead of or in addition to touch interactions.

The memory interface 1810 is coupled to memory 1870. In some embodiments, the memory 1870 includes volatile memory (e.g., high-speed random access memory), non-volatile memory (e.g., flash memory), a combination of volatile and non-volatile memory, and/or any other type of memory. As illustrated in FIG. 18, the memory 1870 stores an operating system (OS) 1872. The OS 1872 includes instructions for handling basic system services and for performing hardware dependent tasks.

The memory 1870 may include communication instructions 1874 to facilitate communicating with one or more additional devices; graphical user interface instructions 1876 to facilitate graphic user interface processing; input processing instructions 1880 to facilitate input-related (e.g., touch input) processes and functions. The memory may also include other instructions such as instructions 1885 to update different types of mobile device state (e.g., location information, carrier information, network connectivity information, etc.). The instructions described above are merely exemplary and the memory 1870 includes additional and/or other instructions in some embodiments. For instance, the memory for a smartphone may include phone instructions to facilitate phone-related processes and functions. The above-identified instructions need not be implemented as separate software programs or modules.

Various functions of the mobile computing device can be implemented in hardware and/or in software, including in one or more signal processing and/or application specific integrated circuits.

While the components illustrated in FIG. 18 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 18 may be split into two or more integrated circuits.

B. Computer System

Figure 19:
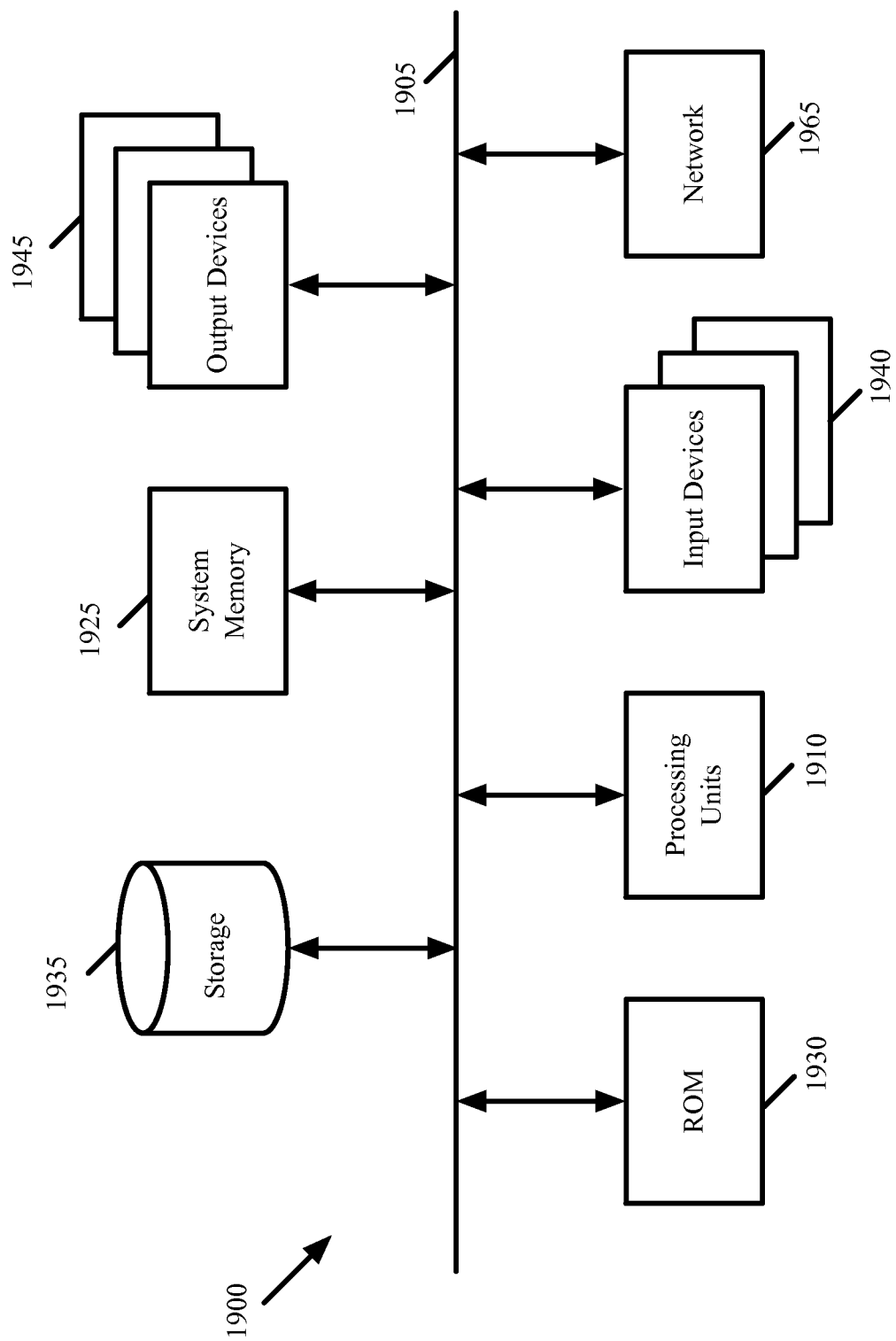
FIG. 19 conceptually illustrates another example of an electronic system with which some embodiments of the invention are implemented.

FIG. 19 conceptually illustrates another example of an electronic system 1900 with which some embodiments of the invention are implemented. The electronic system 1900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1900 includes a bus 1905, processing unit(s) 1910, a graphics processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the read-only memory 1930, the GPU 1915, the system memory 1920, and the permanent storage device 1935.

From these various memory units, the processing unit(s) 1910 retrieves instructions to execute and data to process in order to execute the processes of the invention. The processing unit(s) may be a single processor or a multi-core processor in different embodiments. The read-only-memory (ROM) 1930 stores static data and instructions that are needed by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the invention use a mass-storage device (such as a magnetic or optical disk and its corresponding disk drive) as the permanent storage device 1935.

Other embodiments use a removable storage device (such as a floppy disk, flash memory device, etc., and its corresponding drive) as the permanent storage device Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor needs at runtime. In some embodiments, the invention's processes are stored in the system memory 1920, the permanent storage device 1935, and/or the read-only memory 1930. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. Also, while many of the features of the service monitor have been described as being performed by one component or module (e.g., the output agent, the mobile device state data collector, etc.), one of ordinary skill in the art will recognize that the functions of such components described herein might be split up into multiple sub-components. Similarly, functions described as being performed by multiple different components might be performed by a single component, in some embodiments. Further, while many of the features of the service monitor have been described as being performed by one module, one of ordinary skill in the art will recognize that the functions of such components described herein might be split up into multiple components. Similarly, functions described as being performed by multiple different components might be performed by a single component, in some embodiments. In addition, FIG. 9 conceptually illustrates a process. The specific operations of the process may not be performed in the exact order shown and described. The specific operations may not be performed in one continuous series of operations, and different specific operations may be performed in different embodiments. Furthermore, the process could be implemented using several sub-processes, or as part of a larger macro process.

What is claimed is:

1. A non-transitory machine readable medium storing a program for monitoring performance of an application, wherein when executed by at least one processing unit, the program causes the at least one processing unit to at least:
   monitor transactions performed by the application on a mobile device, the transactions comprising interactions between the mobile device and a set of servers;
   receive, from the mobile device, transaction data related to the transactions performed by the application on the mobile device;
   receive, from the mobile device, system data related to system events occurring on the mobile device external to the transactions occurring within the application;
   aggregate the transaction data for a time period according to different time increments, the transaction data for the time period being stored in a first table aggregated into time intervals according to a first time increment, and the transaction data for the time period being further stored in a second table aggregated into time intervals according to a second time increment; and
   generate a user interface that presents, for the respective transaction: a transaction trace comprising a subset of the system events, and a timeline comprising a plurality of event icons corresponding to the subset of the system events, wherein a particular system event in the transaction trace is highlighted in response to a cursor being placed over a particular event icon in the timeline.

2. The non-transitory machine readable medium of claim 1, wherein when executed the program further causes the at least one processing unit to at least:
   receive a crash report related to a crash of the application.

3. The non-transitory machine readable medium of claim 1, wherein when executed the program further causes the at least one processing unit to receive a set of breadcrumbs, the breadcrumbs indicating data related to a plurality of events occurring in the application.

4. The non-transitory machine readable medium of claim 3, wherein the plurality of events comprises events defined by calls made by the application to a network service.

5. The non-transitory machine readable medium of claim 3, wherein the plurality of events comprises events defined by calls made by the application to the program.

6. The non-transitory machine readable medium of claim 1, wherein when executed the program further causes the at least one processing unit to transmit configuration data to the mobile device, wherein the configuration data comprises events that define the respective transaction.

7. The non-transitory machine readable medium of claim 1, wherein the transaction data comprises a value for the respective transaction.

8. The non-transitory machine readable medium of claim 7, wherein the value for the respective transaction is based on a user's interaction with the application.

9. The non-transitory machine readable medium of claim 7, wherein when executed the program further causes the at least one processing unit to transmit configuration data to the mobile device, wherein the configuration data defines the value for the respective transaction.

10. A method for monitoring transactions performed by an application on a mobile device, the transactions comprising interactions between the mobile device and a set of servers, the method comprising:
   monitoring transactions performed by the application on the mobile device, the transactions comprising interactions between the mobile device and the set of servers;
   receiving, from the mobile device, transaction data related to the transactions performed by the application on the mobile device;
   receiving, from the mobile device, system data related to system events occurring on the mobile device external to the transactions performed by the application;
   aggregating the transaction data for a time period according to different time increments, the transaction data for the time period being stored in a first table aggregated into time intervals according to a first time increment, and the transaction data for the time period being further stored in a second table aggregated into time intervals according to a second time increment; and
   generating a user interface that presents, for the respective transaction: a transaction trace comprising a subset of the system events, and a timeline comprising a plurality of event icons corresponding to the subset of the system events, wherein a particular system event in the transaction trace is highlighted in response to a cursor being placed over a particular event icon in the timeline.

11. The method of claim 10, wherein the user interface further comprises a list of a subset of the transactions, wherein a transaction is presented in association with a result of the transaction and a user revenue risk associated with failure of the transaction.

12. The method of claim 10, further comprising receiving a set of breadcrumbs, the breadcrumbs indicating data related to a plurality of events occurring in the application.

13. The method of claim 12, wherein the plurality of events comprises events defined by calls made by the application to a network service.

14. The method of claim 12, wherein the plurality of events comprises events defined by calls made by the application to a program.

15. The method of claim 10, further comprising transmitting configuration data to the mobile device, wherein the configuration data comprises events that define the respective transaction.

16. The method of claim 10, wherein the transaction data comprises a value for the respective transaction.

17. The method of claim 16, wherein the value for the respective transaction is based on a user's interaction with the application.

18. The method of claim 16, further comprising transmitting configuration data to the mobile device, wherein the configuration data defines the value for the respective transaction.

19. A system for monitoring performance of an application, the system comprising:
   at least one processing unit; and
   a data store comprising instructions that when executed by at least one processing unit cause the at least one processing unit to at least:
      monitor transactions performed by the application on a mobile device, the transactions comprising interactions between the mobile device and a set of servers;
      receive, from the mobile device, transaction data related to the transactions performed by the application on the mobile device;
      receive, from the mobile device, system data related to system events occurring on the mobile device external to the transactions performed by the application;
      aggregate the transaction data for a time period according to different time increments, the transaction data for the time period being stored in a first table aggregated into time intervals according to a first time increment, and the transaction data for the time period being further stored in a second table aggregated into time intervals according to a second time increment; and
      generate a user interface that presents, for the respective transaction: a transaction trace comprising a subset of the system events, and a timeline comprising a plurality of event icons corresponding to the subset of the system events, wherein a particular system event in the transaction trace is highlighted in response to a cursor being placed over a particular event icon in the timeline.

20. The system of claim 19, wherein a respective system event of the subset of the system events comprises a timestamp, and the respective system event is associated with the respective transaction based on the timestamp of the respective system event being within a range defined by a begin timestamp and an end timestamp of the respective transaction.

* * * * *